(12) United States Patent
Yamauchi et al.

(10) Patent No.: US 6,651,026 B2
(45) Date of Patent: Nov. 18, 2003

(54) FIXING CONTROL METHOD AND APPARATUS

(75) Inventors: Shin Yamauchi, Tokyo-To (JP); Masaya Arakawa, Hiratsuka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 49 days.

(21) Appl. No.: 10/003,256

(22) Filed: Dec. 6, 2001

(65) Prior Publication Data
US 2002/0116144 A1 Aug. 22, 2002

(30) Foreign Application Priority Data
Dec. 6, 2000 (JP) ........................................ 2000-371224

(51) Int. Cl.[7] ............................................. G06F 15/00
(52) U.S. Cl. ........................................ 702/132; 399/69
(58) Field of Search ........................... 702/132; 399/69, 399/68, 331, 18, 328, 38; 219/216, 497; 347/14, 180, 67, 156; 62/229, 428; 72/69; 29/800

(56) References Cited

U.S. PATENT DOCUMENTS

| | | | | | |
|---|---|---|---|---|---|
| 4,585,325 A | * | 4/1986 | Euler | ........................... | 399/69 |
| 5,402,211 A | * | 3/1995 | Yoshikawa | .................. | 399/331 |
| 5,918,087 A | * | 6/1999 | Kimura et al. | ................ | 399/69 |

* cited by examiner

*Primary Examiner*—John Barlow
*Assistant Examiner*—Xiuqin Sun
(74) *Attorney, Agent, or Firm*—Foley & Lardner

(57) ABSTRACT

Around a heat roller, a center thermistor (20c) as a first temperature sensor is placed within the range of ±45° from a portion where maximum heat is generated by an IH coil, and a front thermistor (20f) as a second temperature sensor is placed within the range of ±45° from a portion where minimum heat is generated by the IH coil. A main CPU (201) performs fixing control on the basis of sensing temperatures from these two thermistors (20c, 20f). This can prevent an increase in the cost and uniformize the heat distribution of a fixing roller.

18 Claims, 38 Drawing Sheets

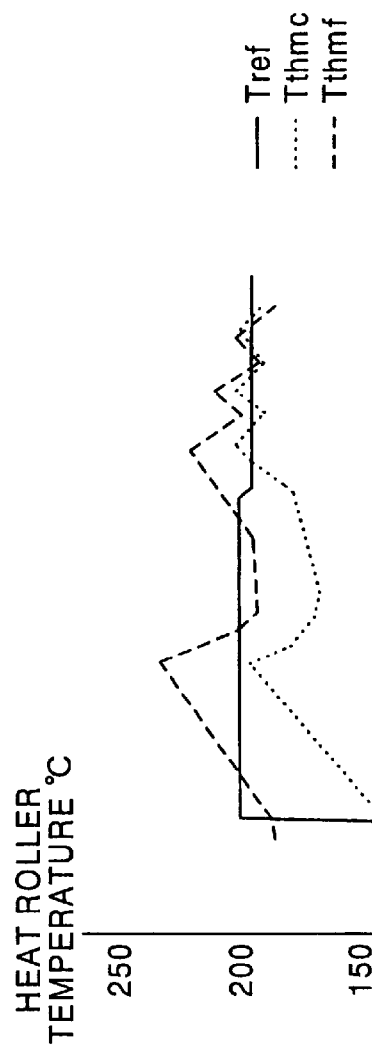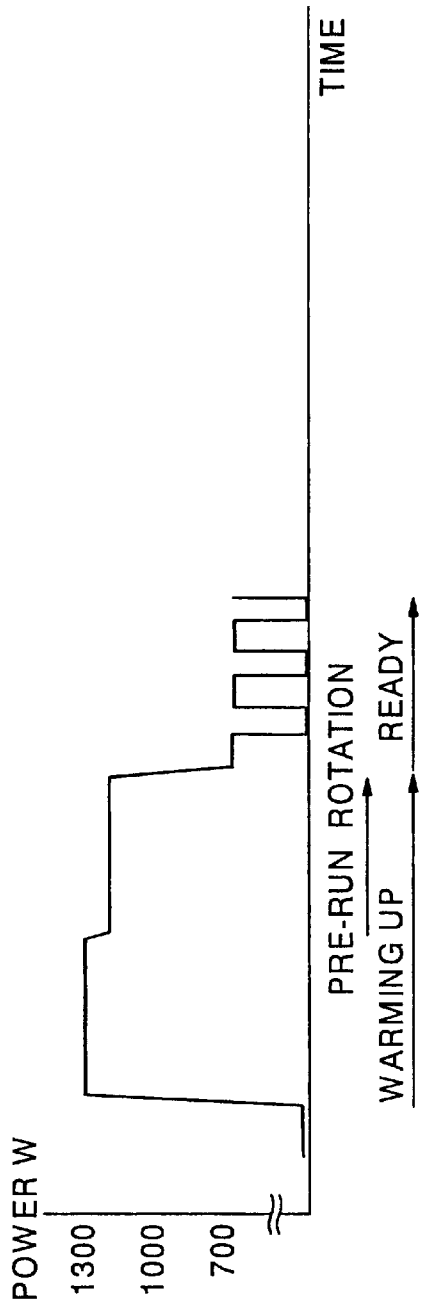

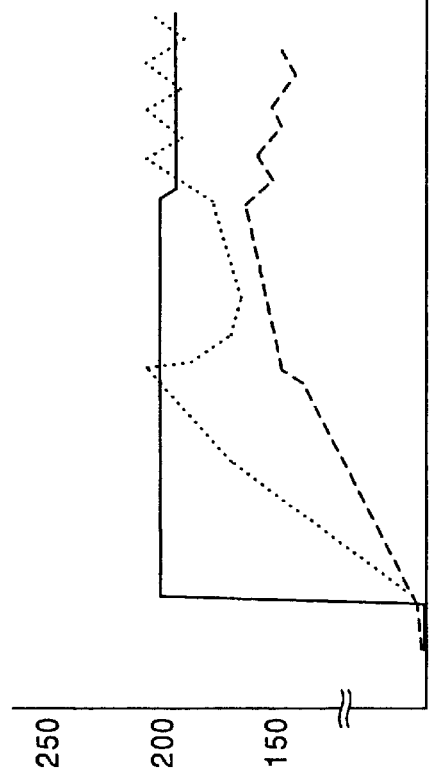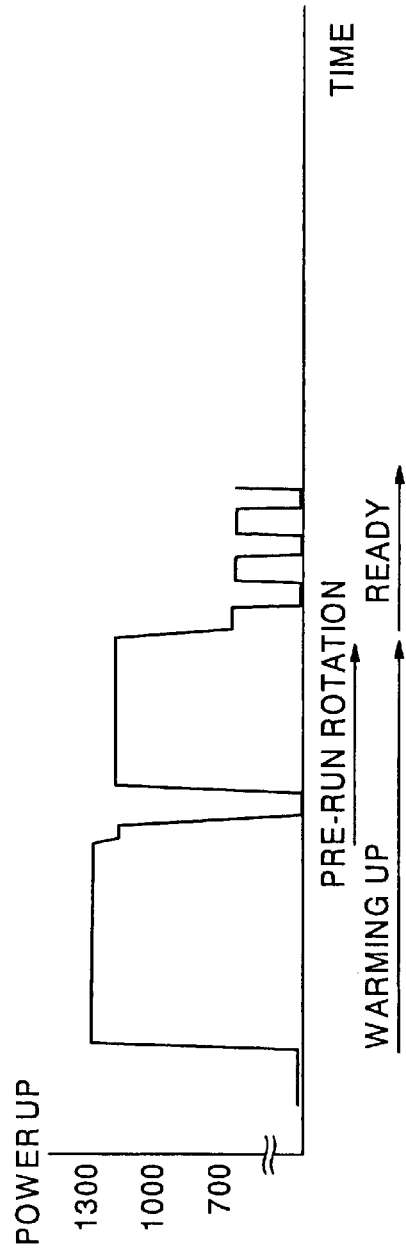
FIG. 13A
FIG. 13B

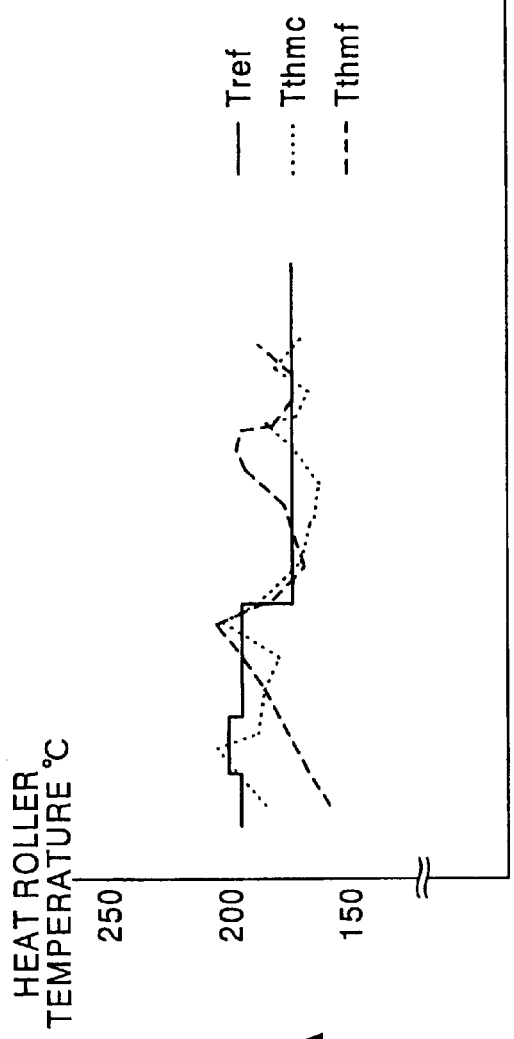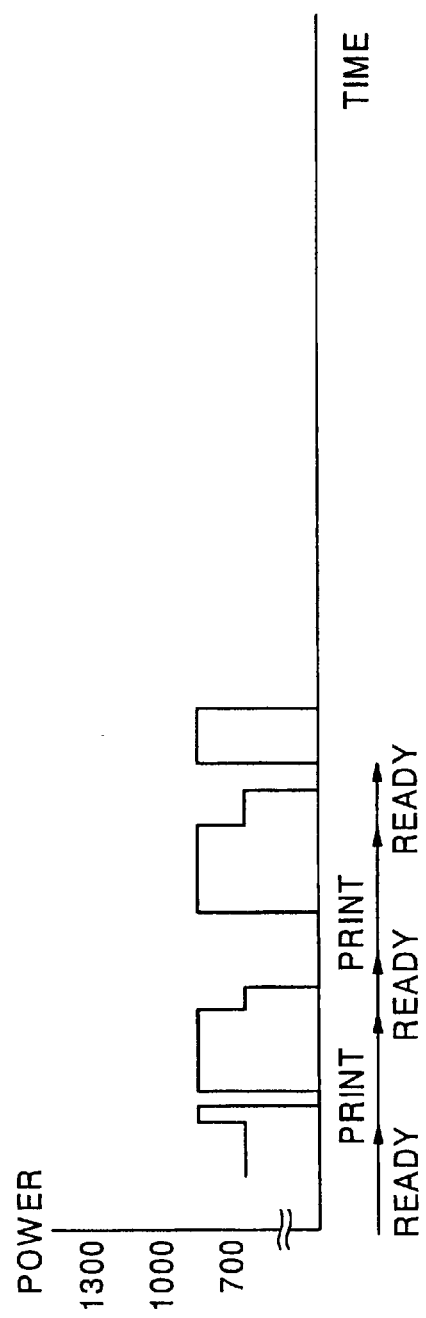

FIXING CONTROL METHOD AND APPARATUS

BACKGROUND OF THE INVENTION

The present invention relates to a fixing control method and apparatus in an electrophotographic system and, more particularly, to a method and apparatus for fixing by using an induction heating (to be referred to IH hereinafter) coil.

Apparatuses using conventional IH coils are disclosed in, e.g., the following references.

(a) Japanese Patent Laid-Open No. 2000-215976

An IH coil is composed of a main heating coil and an auxiliary heating coil. The amount of heat generated in an end portion of a fixing roller is varied by arbitrarily changing the amount of heat generated by the auxiliary heating coil, thereby uniformizing the temperature.

(b) Japanese Patent Laid-Open No. 2000-206813

A plurality of excitation coils are formed to control the electric power of a heating unit for heating the two end portions of a fixing roller, thereby uniformizing the heat distribution of the fixing roller.

In each of these techniques disclosed in references (a) and (b), temperature variations and generated heat variations of a fixing roller of a fixing device using an IH coil are controlled by varying the electric power supplied to heat the two end portions of the fixing roller. In this manner, the heat distribution of the fixing roller is held constant.

Unfortunately, in these systems in which the supply of power is partially controlled, it is difficult to set the length by which the fixing roller is divided. In particular, domestic paper sheets have unique standards (B sizes), so a number of sheet sizes are present. In addition, even sheets of the same size can be used in landscape and portrait positions. Therefore, in a system in which a fixing coil is divided into, e.g., at most three portions, the heat distribution of a fixing roller cannot be uniformized.

Also, when a fixing coil is divided into a plurality of portions, IH control circuits equal in number to the divided portions are necessary. This complicates the circuit and increases the cost.

(c) Japanese Patent Laid-Open No. 11-30928

A fixing device disclosed in this reference can fix images on thick paper sheets by correcting a fixing control temperature even when the environmental temperature changes. That is, this technique can meet changes in the environment and the types of sheets by changing the fixing control temperature.

After the fixing control temperature is changed, however, a fixing roller takes a long time to reach that temperature. Accordingly, this control largely prolongs the first print time before printing of the first sheet is started.

As described above, the method which divides an IH coil cannot uniformize the heat generation of a fixing roller in accordance well with the sizes of various sheets. Also, dividing an IH coil complicates the circuit and increases the cost. The method which corrects the fixing control temperature undesirably prolongs the first print time.

SUMMARY OF THE INVENTION

The present invention has been made in consideration of the above situation, and has as its object to provide a fixing control method and apparatus capable of uniformizing the heat generation of a fixing roller without increasing the first print time.

A fixing control apparatus of the present invention is an apparatus for performing a fixing process by using a heat roller heated by an induction heating coil, characterized by comprising a first temperature sensor positioned, around the heat roller, within the range of ±45° from a portion where maximum heat is generated by the induction heating coil, a second temperature sensor positioned, around the heat roller, within the range of ±45° from a portion where minimum heat is generated by the induction heating coil, and a central processing unit for performing switching control of a fixing control temperature concerning the temperature of the heat roller on the basis of temperatures sensed by the first and second temperature sensors.

In this apparatus, when power supply to the induction heating coil is started, the central processing unit can change at least one of the fixing control temperature, a pre-run start temperature at which pre-run is started, and a ready display temperature pertaining to temperature display in a ready state, on the basis of the temperatures sensed by the first and second temperature sensors.

Alternatively, when power supply to the induction heating coil is started, the central processing unit can lower the fixing control temperature and the pre-run start temperature, as the temperature sensed by the first or second temperature sensor rises.

The fixing control temperature can be changed such that the temperatures sensed by the first and second temperature sensors fall within a predetermined printing permissible temperature range in a ready state, the fixing control apparatus can further comprise an environmental temperature sensor for sensing an environmental temperature, and the central processing unit can change the fixing control temperature on the basis of the environmental temperature sensed by the environmental temperature sensor.

At the start of printing, the central processing unit can change the fixing control temperature on the basis of the temperatures sensed by the first and second temperature sensors, the fixing control apparatus can further comprise an environmental temperature sensor for sensing an environmental temperature, and, on the basis of the environmental temperature sensed by the environmental temperature sensor, the central processing unit can change, in accordance with a sheet to be printed, the fixing control temperature and a threshold value for determining whether an environment is a normal environment or a low-temperature environment on the basis of the environmental temperature sensed by the environmental temperature sensor.

Alternatively, at the start of printing, the central processing unit can check whether the temperatures sensed by the first and second temperature sensors fall within a predetermined printing permissible temperature range, permit printing if the temperatures fall within the range, and perform pre-run if not, the fixing control apparatus can further comprise an environmental temperature sensor for sensing an environmental temperature, and, on the basis of the environmental temperature sensed by the environmental temperature sensor, the central processing unit can change the printing permissible temperature range in accordance with a sheet to be printed.

During printing, the central processing unit can change the fixing control temperature for each sheet to be printed whenever a predetermined time elapses, on the basis of a result of comparison of the temperatures sensed by the first and second temperature sensors with a lower-limiting threshold value of a printing permissible range, the fixing control apparatus can further comprise an environmental temperature sensor for sensing an environmental temperature, and, on the basis of the environmental temperature sensed by the environmental temperature sensor, the central processing unit can change the lower-limiting threshold value.

In an operation mode in which pre-run continues for not less than a predetermined time, the central processing unit can lower the fixing control temperature or stop power supply to the induction heating coil.

A fixing control method of the present invention is characterized in that switching control of a fixing control temperature concerning the temperature of a heat roller is performed on the basis of a temperature sensed by a first temperature sensor positioned, around the heat roller, within the range of ±45° from a portion where maximum heat is generated by an induction heating coil, and a temperature sensed by a second temperature sensor positioned, around the heat roller, within the range of ±45° from a portion where minimum heat is generated by the induction heating coil.

BRIEF DESCRIPTION OF THE DRAWINGS

FIGS. 11A and 11B are graphs showing changes in the fixing control temperature and the thermistor detection temperature when control of this embodiment is performed;

FIGS. 13A and 13B are graphs showing changes in the fixing control temperature and the thermistor detection temperature when fixing control related to this embodiment is performed;

FIGS. 24A and 24B are graphs showing changes in the fixing control temperature and the thermistor detection temperature when intermittent printing of this embodiment is performed;

DESCRIPTION OF THE PREFERRED EMBODIMENT

An embodiment of the present invention will be described below with reference to the accompanying drawings.

Figure 1:
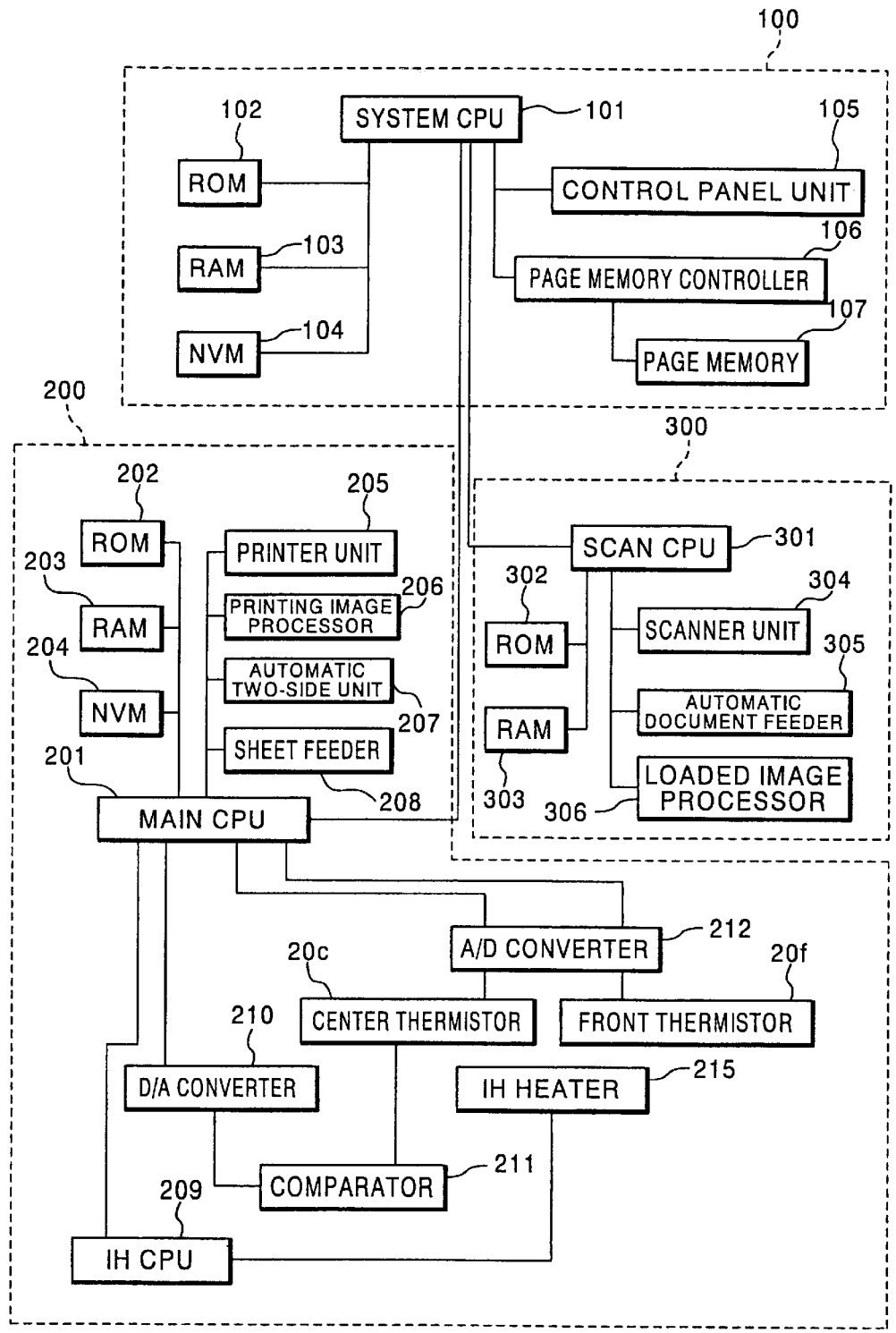
FIG. 1 is a block diagram showing the circuit configuration of a whole electrophotographic system including a fixing control apparatus according to an embodiment.

FIG. 1 shows the circuit configuration of a whole electrophotographic system including a fixing control apparatus according to this embodiment.

This electrophotographic system is roughly divided into a system section 100 for controlling the operation of the whole electrophotographic system in accordance with inputs from an operator, a main body section 200 for controlling the operations of the main body such as a print operation, image processing operation, and paper feed operation, and a scanner section 300 for controlling a scanner operation, automatic document feeding operation, and image processing operation. The system section 100, the main body section 200, and the scanner section 300 have a system CPU 101, a main CPU 201, and a scan CPU 301, respectively, as central processing units (CPUs).

In addition to the system CPU 101, the system section 100 includes a ROM (Read Only Memory) 102, a RAM (Random Access Memory) 103, a non-volatility RAM (to be referred to as an NVR hereinafter) 104, a control panel unit 105, a page memory controller 106, and a page memory 107.

In addition to the main CPU 201, the main section 200 includes a ROM 202, a RAM 203, an NVM 204, a printer unit 205, a printing image processor 206, an automatic two-side unit 207, a sheet feeder 208, an IH CPU 209, a D/A (digital-to-analog) converter 210, a comparator 211, an A/D (analog-to-digital) converter 212, a center thermistor 20c and front thermistor 20f to be described later, and an IH heater 215.

In addition to the scan CPU 301, the scanner section 300 includes a ROM 302, a RAM 303, a scanner unit 304, an automatic document feeder 305, and a loaded image processor 306.

The system CPU 101 operates in accordance with programs written in the ROM 102, and uses the RAM 103 and NVM 104 where necessary. Similarly, the main CPU 201 operates in accordance with programs written in the ROM 202, and uses the RAM 203 and the NVM 204 where necessary. The scan CPU 302 also operates in accordance with programs written in the ROM 302, and uses the RAM 303 as needed.

In accordance with an operation which an operator inputs into the control panel unit 105, the system CPU 101 designates the contents of operations of the main CPU 201 and the scan CPU 301. In the case of a page printer, the system CPU 101 controls, the page memory 107 for storing image data in units of read pages, via the page memory controller 106.

The main CPU 201 controls, in accordance with designations, the operations of the printer unit 205, the printing image processor 206, the automatic two-side unit 207, and the sheet feeder 208, more specifically, controls motors, clutches, and the like of these units. Also, the main CPU 201 monitors status changes of outputs from internal switches and sensors of these units, and manages their operations. Furthermore, the main CPU 201 transfers, to the system CPU 101, status signals indicative of the operating states of the printer unit 205, the printing image processor 206, the automatic two-side unit 207, and the sheet feeder 208.

The main CPU 201 also loads output analog signals from the center thermistor 20c and the front thermistor 20f as digital data via the A/D converter 212. The comparator 211 compares the output analog signal from the center thermistor 20c with an analog signal obtained by converting a threshold value, which is the output digital signal from the main CPU 201, by the D/A converter 210. The comparison result is supplied to the main CPU 201. On the basis of this comparison result, the main CPU 201 controls ON/OFF of the IH heater 215 via the IH CPU 209.

On the basis of operation designations given by the system CPU 101, the scan CPU 301 controls the operations of the scanner unit 304, the automatic document feeder 305, and the loaded image processor 306. The main CPU 201 outputs to the system CPU 101 the operating states of the scanner unit 304, the automatic document feeder 305, and the loaded image processor 306 as status signals.

Consequently, the operating states of all these units are loaded into the system CPU 101. This allows the system CPU 101 to monitor the operating states at all times and control the whole system on the basis of the operating states and the contents of operations input to the control panel unit 105.

In the fixing control apparatus according to this embodiment, primarily the main CPU 201 performs operations necessary for fixing control. Also, this main CPU 201 transfers the fixing operation state as a status signal to the system CPU 101, thereby managing the operation of the whole electrophotographic system.

More specifically, in this embodiment as will be described later, when switching control of a fixing control temperature Tref is to be performed, the main CPU 201 changes this temperature Tref to be supplied to the comparator 211 via the D/A converter 210.

As to control of power supply necessary for fixing, the main CPU 201 controls the supply of power to the IH heater 215 via the IH CPU 209.

To control the rotation of a heat roller necessary for fixing, the main CPU 201 controls the motor of the printer unit 205. This is so because the heat roller is driven by the motor of the printer unit 205 without using any dedicated motor. If a motor dedicated to a fixing unit is used, a path for controlling this motor from the main CPU 201 is necessary.

Figure 2:
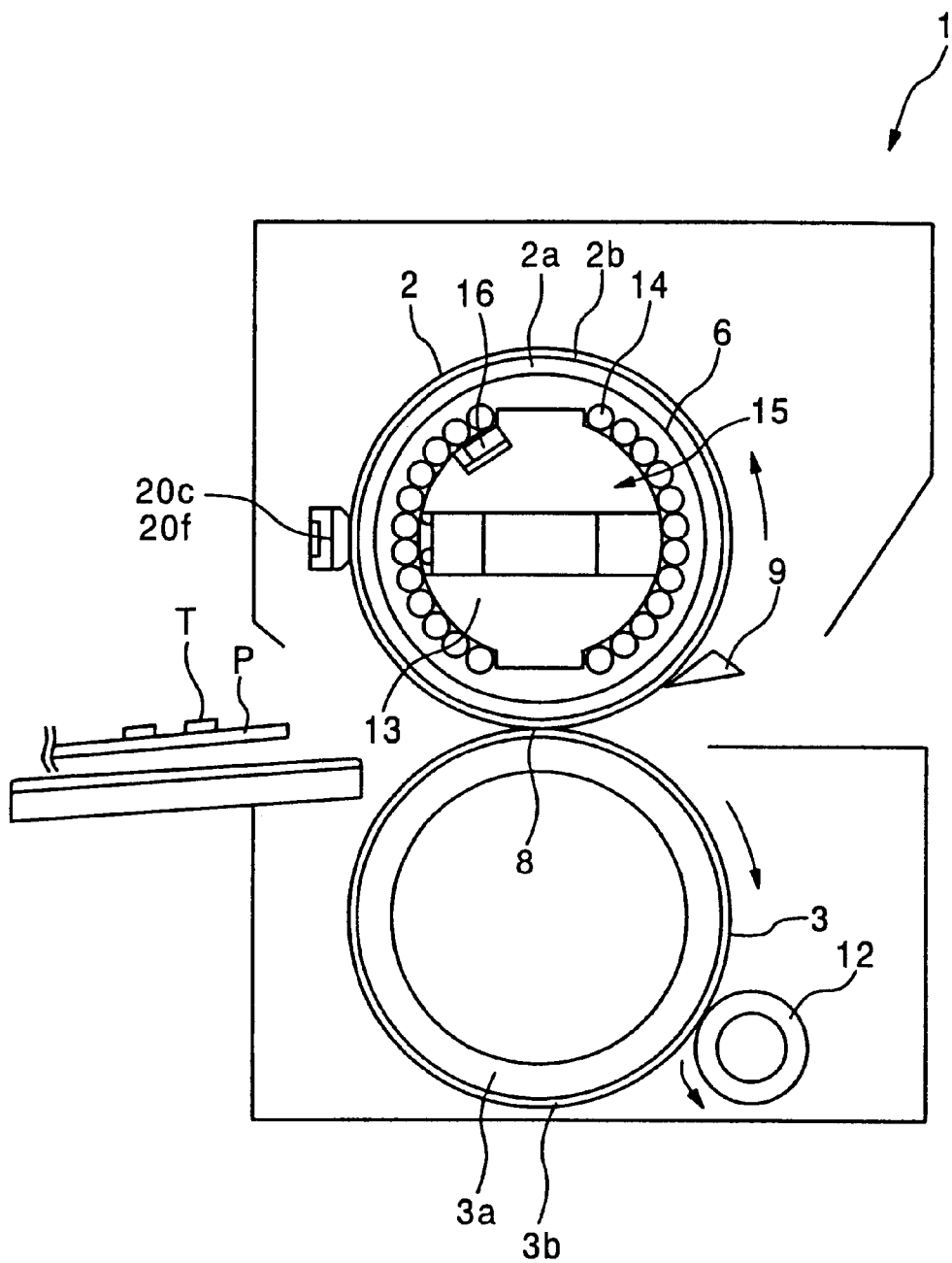
FIG. 2 is a longitudinal sectional view showing the structure of a fixing roller and its surroundings in the fixing control apparatus.
Figure 3:
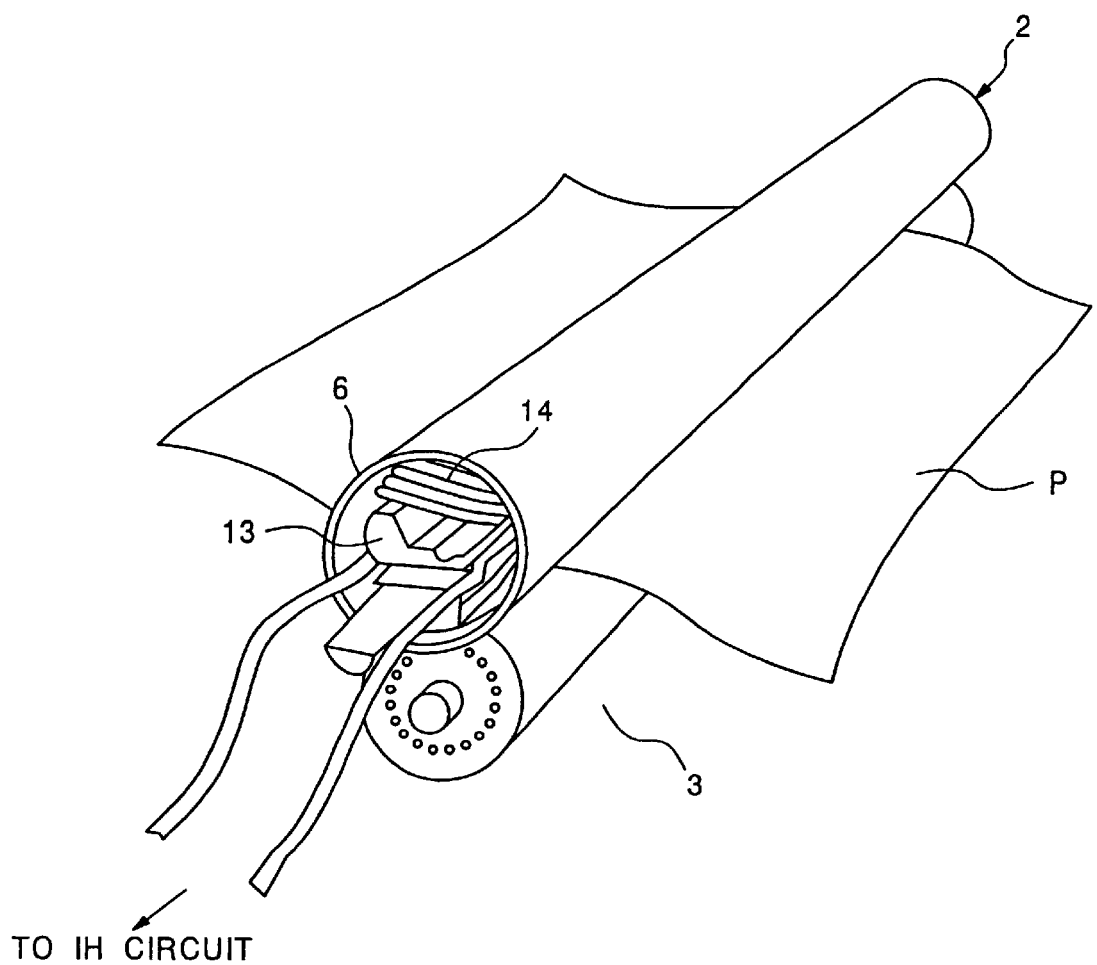
FIG. 3 is a perspective view showing the way a fixing process is performed on a sheet by the fixing roller in the fixing control apparatus.

FIG. 2 shows the longitudinal sectional structure of the fixing control apparatus according to this embodiment. FIG. 3 is a perspective view of a heat roller and a press roller of this fixing control apparatus. A heat roller 2 and a press roller 3 are used as fixing rollers.

The heat roller 2 is a conductor roller. This heat roller 2 is rotated in the direction of an arrow by a driving transmitting means (now shown) which transmits the rotation of a motor (not shown) placed in an end portion in the axial direction.

For example, the heat roller 2 has an outside diameter of 40 mm and a thickness of 1.0 mm, and iron is used as a core metal 2a. A fluorine coating layer 2b having a thickness of 10 to 30 µm is formed around the core metal 2a. This fluorine coating layer 2b is a coating material made of nonconductive PFA or PTFE, or a mixture of PFA and PTEF.

An IH coil 15 for generating a magnetic field is formed inside the heat roller 2. This IH coil 15 has an excitation coil on which a power supply 14 is wound, and a core member 13 which supports the excitation coil. This core member 13 is made of a heat-resistant resin.

The IH coil 15 generates an AC magnetic field by an RH circuit (not shown), thereby generating an eddy current in the heat roller 2 and generating heat by Joule heat.

The press roller 3 is rotatably set and rotates in the direction of an arrow by being pressed by the heat roller 2. This press roller 3 has a core metal made of iron, a 5-mm thick sponge rubber layer 3a, and a fluorine covering tube layer 3b formed around the sponge rubber layer 3a. This fluorine covering tube layer 3b is conductive and has a film thickness of 30 to 100 $\mu$m and an outer diameter of 30 mm. Also, the press roller 3 has a permissible load of 200 to 400 N, a nip width with respect to the heat roller 2 of 4 to 8 mm, and a surface hardness degree (Asker C) of 50 to 60.

A fixing medium T has a sheet P and a toner image formed on the surface of the sheet P by an electrophotographic process. The toner image is fixed on the sheet P by heat when passing through a nip 8 between the heat roller 2 and the press roller 3.

A thermostat 16 is set inside the heat roller 2. A plurality of thermistors 20c and 20f are arranged around the heat roller 2 as will be described later. A separation claw 9 for separating the sheet P is also arranged around the heat roller 2.

A cleaning roller 12 having an outside diameter of 14 mm and made of an iron core is positioned around the press roller 3 so as to be rotatable following the press roller 3.

The IH coil 15 used in this embodiment has no core. This makes it possible to bring out the performance of the IH coil 15 by a high electric current.

Accordingly, the electric wire 14 forming this IH coil 15 must have a thickness with which this electric wire 14 can withstand this electric current. However, the use of a thick electric wire is not effective owing to the well-known skin effect, so a Litz wire must be used. In this embodiment, for example, 19 twisted heat-resistant enamel wires (covered with polyimide) 0.5 mm in diameter are used.

As temperature sensing means, the thermistors 20c and 20f are formed on the outer circumferential surface of the heat roller 2 as will be described below.

Compared to a case in which a lamp is used as a heating means, the IH coil 15 produces large temperature variations in the circumferential and longitudinal directions, so finer fixing control is required.

Figure 4A:
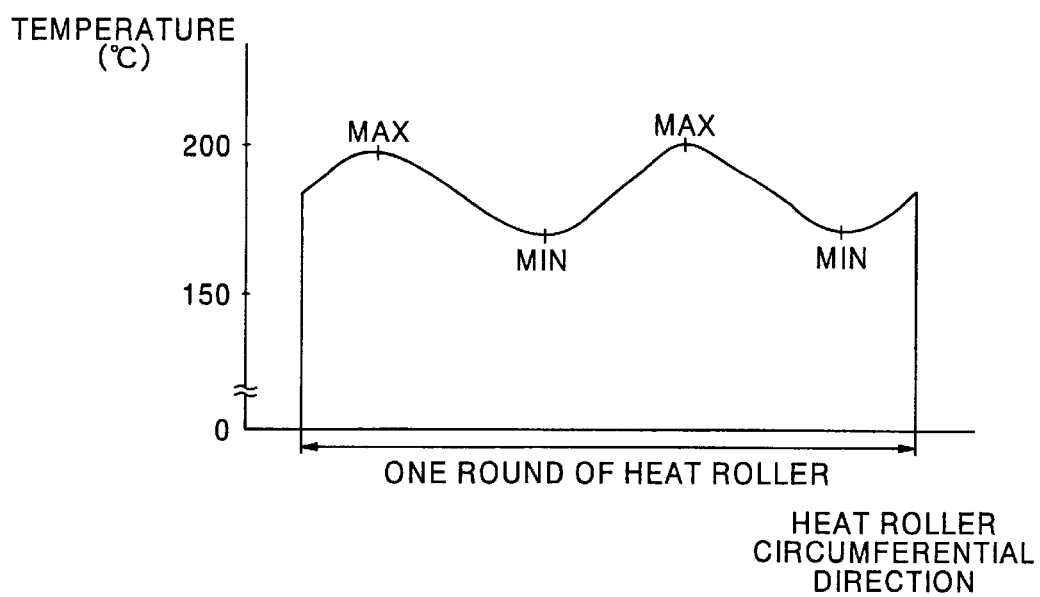
FIG. 4A is a graph showing the temperature distribution in the circumferential direction of a heat roller in a ready state.
Figure 4B:
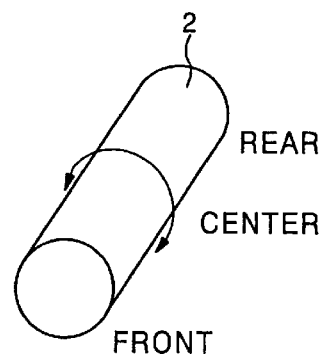
FIG. 4B is a perspective view of the heat roller.

As shown in FIG. 4A, two positions MAX at which the fixing roller temperature is a maximum and two positions MIN at which this temperature is a minimum are present, in a ready (standby) state, with a phase shift of 180°, in the circumferential direction of the heat roller 2 indicated by an arrow in FIG. 4B.

Figure 5A:
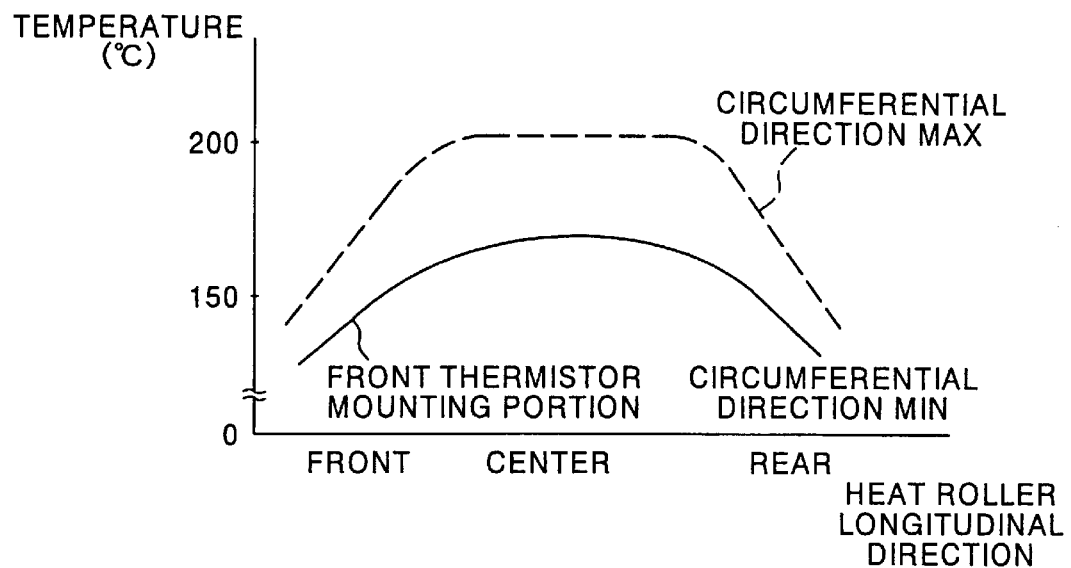
FIG. 5A is a graph showing the temperature distribution in the longitudinal direction of the heat roller in the ready state.
Figure 5B:
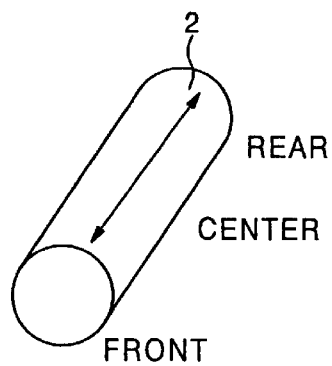
FIG. 5B is a perspective view of the heat roller.

In the longitudinal direction of the heat roller 2 indicated by an arrow in FIG. 5B, a temperature distribution is present, in the ready state, in which the temperature is high in the center and gradually lowers toward the two end portions. Therefore, temperature sensors for controlling the fixing temperature are arranged as follows.

Figure 6:
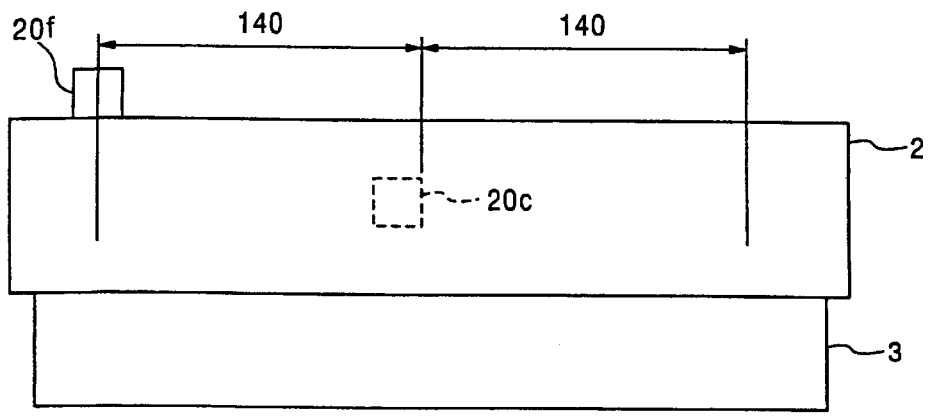
FIG. 6 is a front view showing the arrangement of a plurality of thermistors around the heat roller in the fixing control apparatus of this embodiment.
Figure 7:
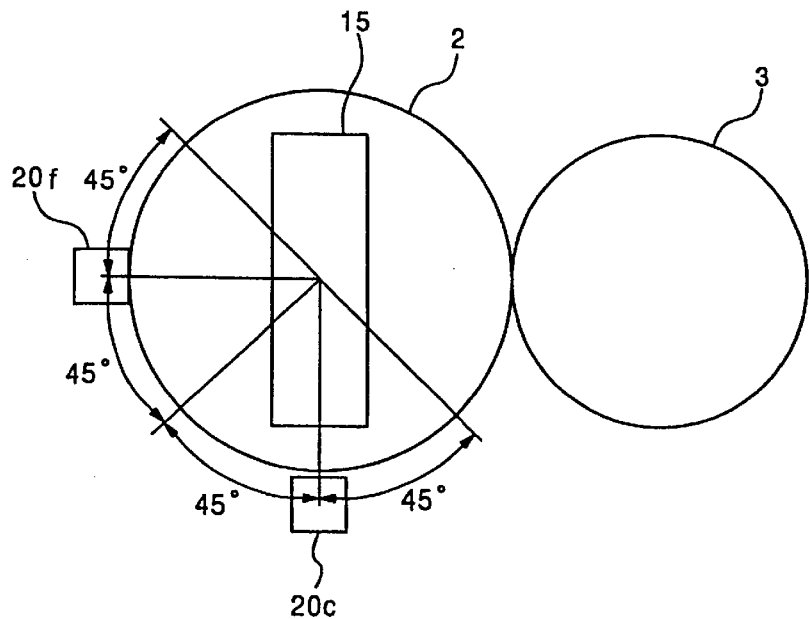
FIG. 7 is a longitudinal sectional view showing the arrangement of the thermistors around the heat roller in the fixing control apparatus.

A temperature sensor for measuring the temperature in the center of the fixing roller must be able to detect, as much as possible, the position MAX in which the fixing roller temperature is a maximum in the ready state. Hence, as shown in FIG. 6 which illustrates the fixing roller in the longitudinal direction and FIG. 7 which depicts the longitudinal section of the fixing roller, the thermistor 20c is fixed to a position which is within the range of ±45° in the circumferential direction from a maximum heat generating portion of the IH coil 15, and which is substantially the center in the longitudinal direction.

A temperature sensor for measuring the temperature in an end portion of the fixing roller must be able to sense, as much as possible, the position MIN in which the temperature of the fixing roller is a minimum in the ready state. Therefore, the thermistor 20f is fixed to a position which is within the range of ±45° in the circumferential direction from a minimum heat generating portion of the IH coil 15, and which is a front portion in the longitudinal direction.

For example, specifications of the apparatus according to this embodiment are as follows.

Process speed: 200 to 250 mm/sec
Printing speed: 35 to 45 sheets/min (A4 landscape)
Warming-up time: 30 sec or less Next, (1) fixing control, (2) ready control, and (3) printing control of this embodiment will be explained below.

(1) Fixing Control

Assume that the temperature sensed by the thermistor 20f attached to the front position to sense the temperature in an end portion of the fixing roller is a front thermistor sensing temperature Tthmf, the temperature sensed by the thermistor 20c attached to the center of the fixing roller is a center thermistor sensing temperature Tthmc, and the fixing control temperature set by the main CPU 201 as to the temperature of the fixing roller is the fixing control temperature Tref.

1-1) Warming Up Control (From Power ON to Start of Pre-Run)

Supply power: 1,300 W
Fixing temperature: Center thermistor temperature Tthmc is 225° C.

If the center thermistor temperature Tthmc reaches 205° C., the operation proceeds to warming-up pre-run control to be described next.

Motor: OFF, Heat roller: Stopped

Figure 8:
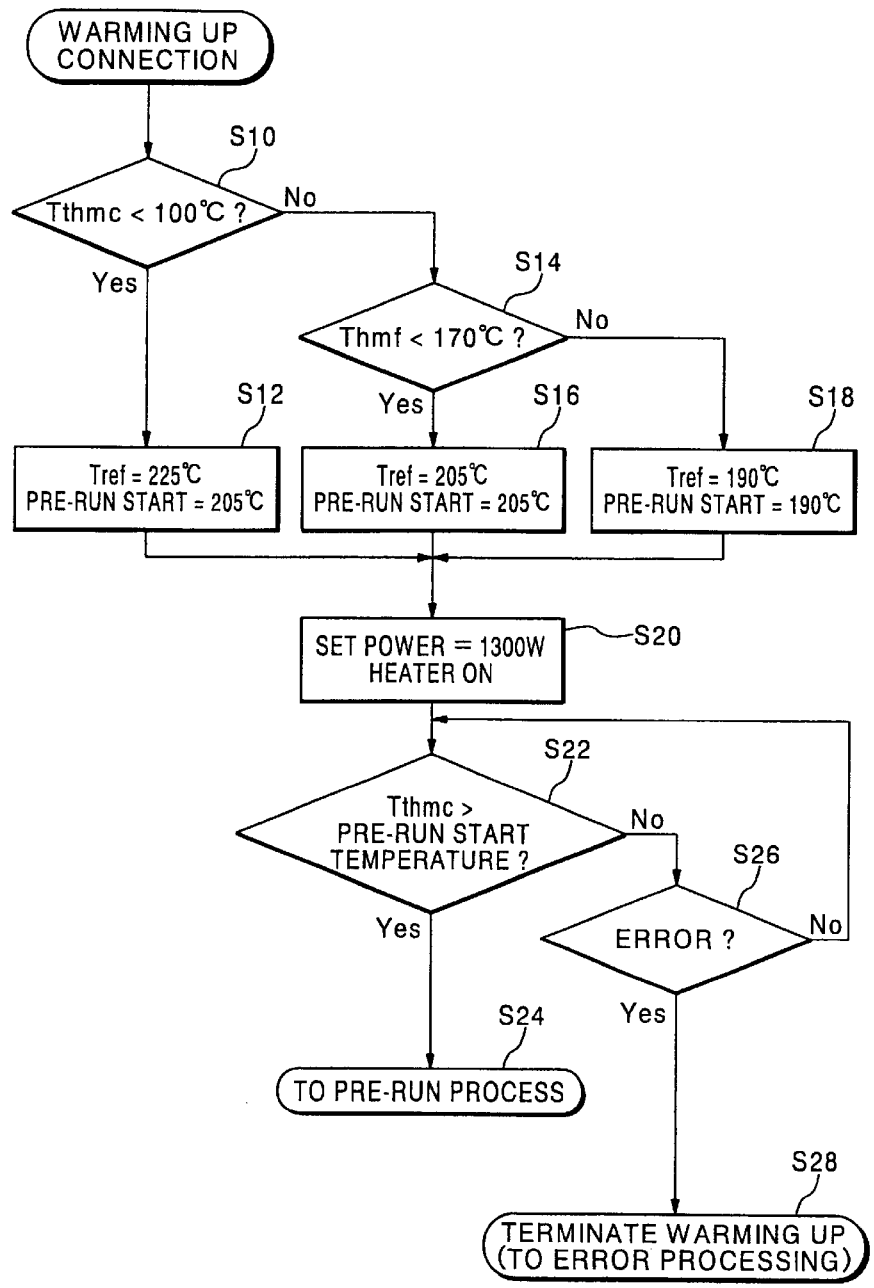
FIG. 8 is a flow chart showing the procedure of warming-up control when warming up of this embodiment is started.

FIG. 8 shows the procedure from the start of warming up to a pre-run process or to the process of terminating warming up.

After warming up is started, in step S10 whether the thermistor temperature Tthmc is less than 100° C. is checked. If this temperature Tthmc is less than 100° C., in step S12 the fixing control temperature Tref and the pre-run start temperature are set at 225° C. and 205° C., respectively. If the thermistor temperature Tthmc is 100° C. or more, the flow advances to step S14.

In step S14, whether the thermistor temperature Tthmc is less than 170° C. is checked. If this temperature Tthmc is less than 170° C., in step S16 both the fixing control temperature Tref and the pre-run start temperature are set at 205° C.

If the thermistor temperature Tthmc is 170° C. or more, in step S18 both the fixing control temperature Tref and the pre-run start temperature are set at 190° C. In this way, switching control is so performed that as the thermistor temperature Tthmc rises, the fixing control temperature Tref and the pre-run start temperature are lowered to prevent a temperature rise.

In step S20, the supply power to the IH coil 15 is set at 1,300 W, and the IH heater 215 is turned on.

In step S22, whether the thermistor temperature Tthmc is higher than the pre-run start temperature is checked. If YES in step S22, the flow advances to step S24 to proceed to a pre-run process. If the thermistor temperature Tthmc is equal to or lower than the pre-run start temperature, whether there is an error is checked in step S26. If there is an error, the flow advances to step S28 to terminate the warming up process and perform error processing. If there is no error, the flow returns to step S22.

The temperature relationships in the above warming up start process are as follows.

| | |
|---|---|
| Tthmf and Tthmc < 100° C. | :Tref = 225° C. |
| 100° C. ≦ Tthmc, Tthmf < 100° C. | :Tref = 225° C. |
| 100° C. ≦ Tthmc, 100° C. ≦ Tthmf < 170° C. | :Tref = 205° C. |
| 100° C. ≦ Tthmc, 170° C. ≦ Tthmf | :Tref = 190° C. |

Figure 10A:
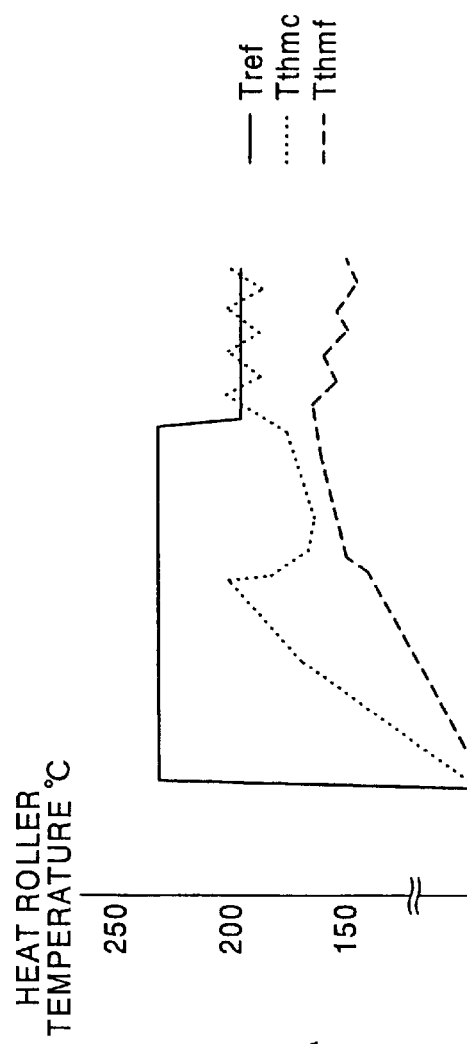
FIGS. 10A and 10B are graphs showing changes in the fixing control temperature and the thermistor detection temperature when control of this embodiment is performed.
Figure 10B:
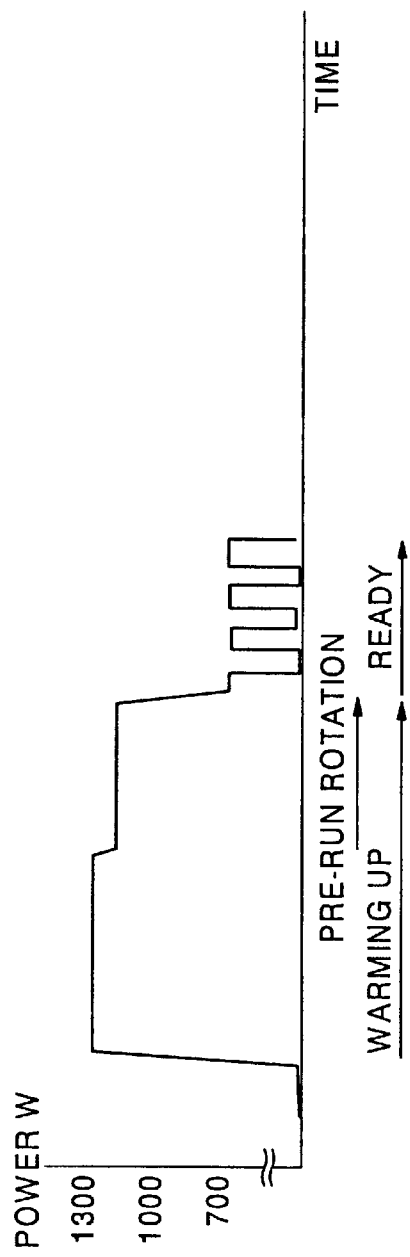
Figure 12A:
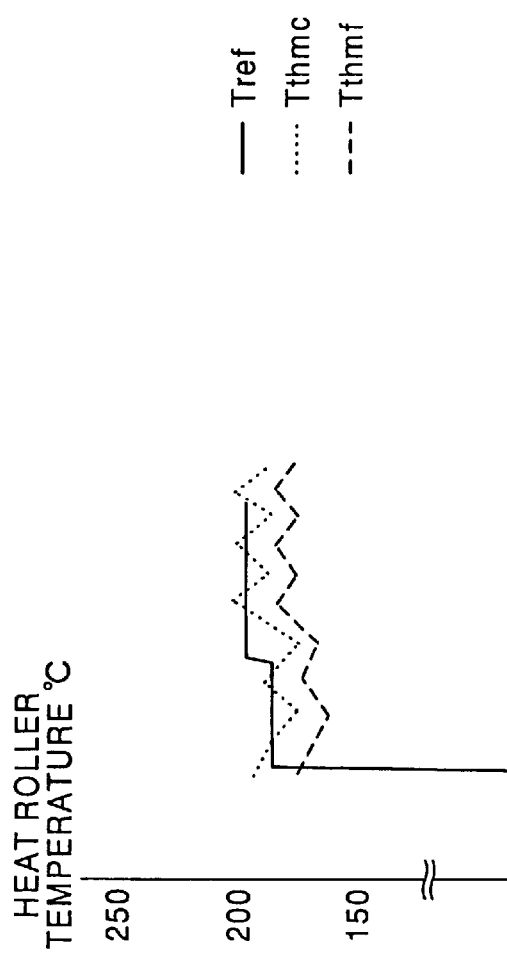
FIGS. 12A and 12B are graphs showing changes in the fixing control temperature and the thermistor detection temperature when control of this embodiment is performed.
Figure 12B:
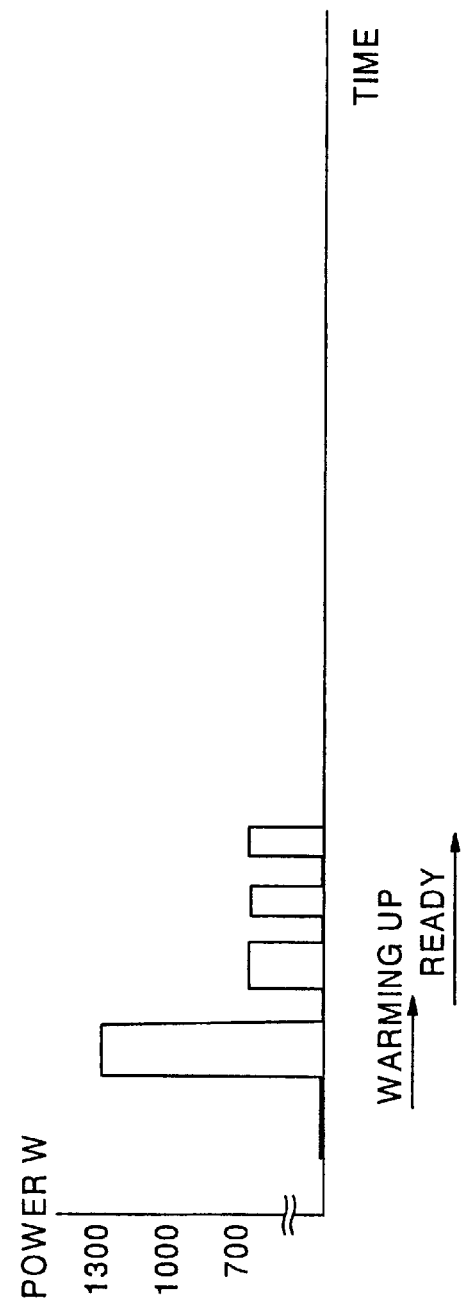

Graphs of changes in the thermistor temperatures Tthmc and Tthmf and the fixing control temperature Tref with time at the start of warming up are as shown in the warming-up period of FIGS. 10A, 11A, and 12A. Also, electric powers supplied to the fixing coil 15 are as shown in FIGS. 10B, 11B, and 12B.

The relationships between the temperatures Tthmc and Tthmf at the start of warming up shown in FIGS. 10A, 11A, and 12A are as follows.

FIG. 10A: Tthmf and Tthmc<100° C.

FIG. 11A: 100° C.≦Tthmc, 100° C.≦Tthmf<200° C.

FIG. 12A: 170° C.≦Tthmc<200° C., 100° C.≦Tthmf≦170° C.

In addition, as a means for sensing the environmental temperature, a thermistor is set near a photosensitive roller (not shown). The fixing control temperature Tref and the pre-run temperature can also be changed in accordance with the environmental temperature sensed by this thermistor.

1-2) Pre-Run Control (Pre-Run Start to Ready Display)

Supply power: 1,300 W

Fixing temperature: Center thermistor temperature Tthmc is 225° C.

If the center thermistor temperature Tthmc is 180° C. or more after a ready sensing delay time t2 (e.g., 3 sec) has elapsed, ready display is performed and pre-run is stopped.

If the environmental sensing temperature is 16° C. or less, it is determined that the environment is a low-temperature one. In this case, if the center thermistor temperature Tthmc is 200° C. or more after the ready sensing delay time t2 (e.g., 3 sec) has elapsed, ready display is performed and pre-run is stopped.

In this case, the motor of the printer unit 205 is turned on to rotate the heat roller 2.

Figure 9:
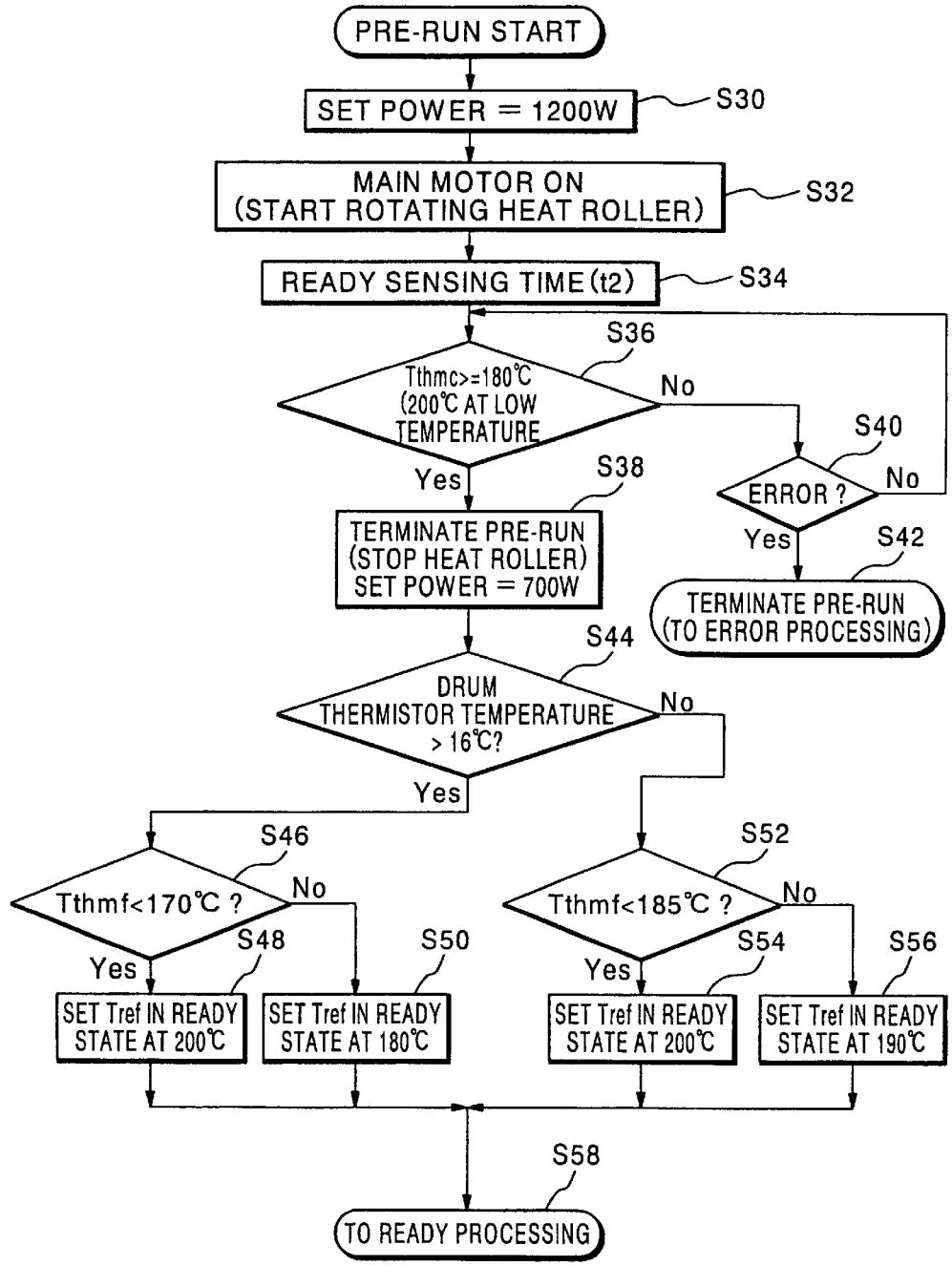
FIG. 9 is a flow chart showing the procedure of pre-run control when warming up of this embodiment is started.

The procedure of the pre-run control process is shown in steps S30 to S42 of FIG. 9.

After pre-run is started, in step S30 the supply power to the IH coil 15 is set at 1,200 W.

In step S32, the motor of the printer unit 205 is turned on to start rotating the heat roller 2.

In step S34, the ready sensing delay time t2 is allowed to elapse.

In step S36, whether the thermistor temperature Tthmc is 180° C. or more is checked. If the environment is a low-temperature one, whether the temperature Tthmc is 200° C. or more is checked.

If the temperature Tthmc is 180° C. or more, the flow advances to step S38 to terminate the pre-run, stop the rotation of the heat roller 2, and lower the supply power to the IH coil 15 to 700 W. If the temperature Tthmc is less than 180° C., whether there is an error is checked in step S40. If there is an error, the flow advances to step S42 to terminate the pre-run and perform error processing. If there is no error, the flow returns to step S36.

The temperature relationships in the above pre-run control are as follows.

Tthmf and Tthmc<100° C.: Pre-run is started when 205° C.≦Tthmc

100° C.≦Tthmc, Tthmf<100° C.: Pre-run is started when 205° C.≦Tthmc

100° C.≦Tthmc, 100° C.≦Tthmf<170° C.: Pre-run is started when 205° C.≦Tthmc

100° C.≦Tthmc, 170° C.≦Tthmf<170° C.: Pre-run is started when 190° C.≦Tthmc

Graphs of changes in the thermistor temperatures Tthmc and Tthmf and the fixing control temperature Tref with time during the pre-run start process are as shown in the pre-run period of FIGS. 10A, 11A, and 12A.

1-3) Ready Display Control

At normal environmental temperatures, ready display is performed when the center thermistor temperature Tthmc is 180° C. or more or 200° C. or more.

If the environmental temperature is 16° C. or less, the main CPU 201 determines that the environment is a low-temperature one. In this case, the main CPU 201 performs ready display when the center thermistor temperature Tthmc is 200° C. or more.

The temperature relationships in this ready display control are as follows.

If Tthmf & Tthmc<100° C.: Ready display is performed when 180° C.≦Tthmc (In a low-temperature environment, ready display is performed when 200° C.≦Tthmc)

If 100° C.≦Tthmc, Tthmf<100° C.: Ready display is performed when 180° C.≦Tthmc (In a low-temperature environment, ready display is performed when 200° C.≦Tthmc)

If 100° C.≦Tthmc, 100° C.≦Tthmf<170° C.: Ready display is performed when 180° C.≦Tthmc (In a low-temperature environment, ready display is performed when 200° C.≦Tthmc)

If 100° C.≦Tthmc, 170° C.≦Tthmf: Ready display is performed when 180° C.≦Tthmc (In a low-temperature environment, ready display is performed when 190° C.≦Tthmc)

Graphs of changes in the thermistor temperatures Tthmc and Tthmf and the fixing control temperature Tref with time during the pre-run start process are as shown in the pre-run rotation period of FIGS. 10A to 12B.

In warming up when the power supply is turned on for the first time in the morning as shown in FIGS. 13A and 13B, pre-run is started with the fixing roller at the lowest temperature. In a case like this, the thermistor temperature Tthmc overshoots and becomes higher than the fixing control temperature Tref, so the supper power is stopped. This undesirably delays the warming-up time by 3 to 7 seconds.

In contrast, performing temperature switching control in accordance with this embodiment prevents any overshoot of the temperature Tthmc, avoids any stoppage of the supply power, and thereby shortens the warming-up time.

Figures 14A, 14B:
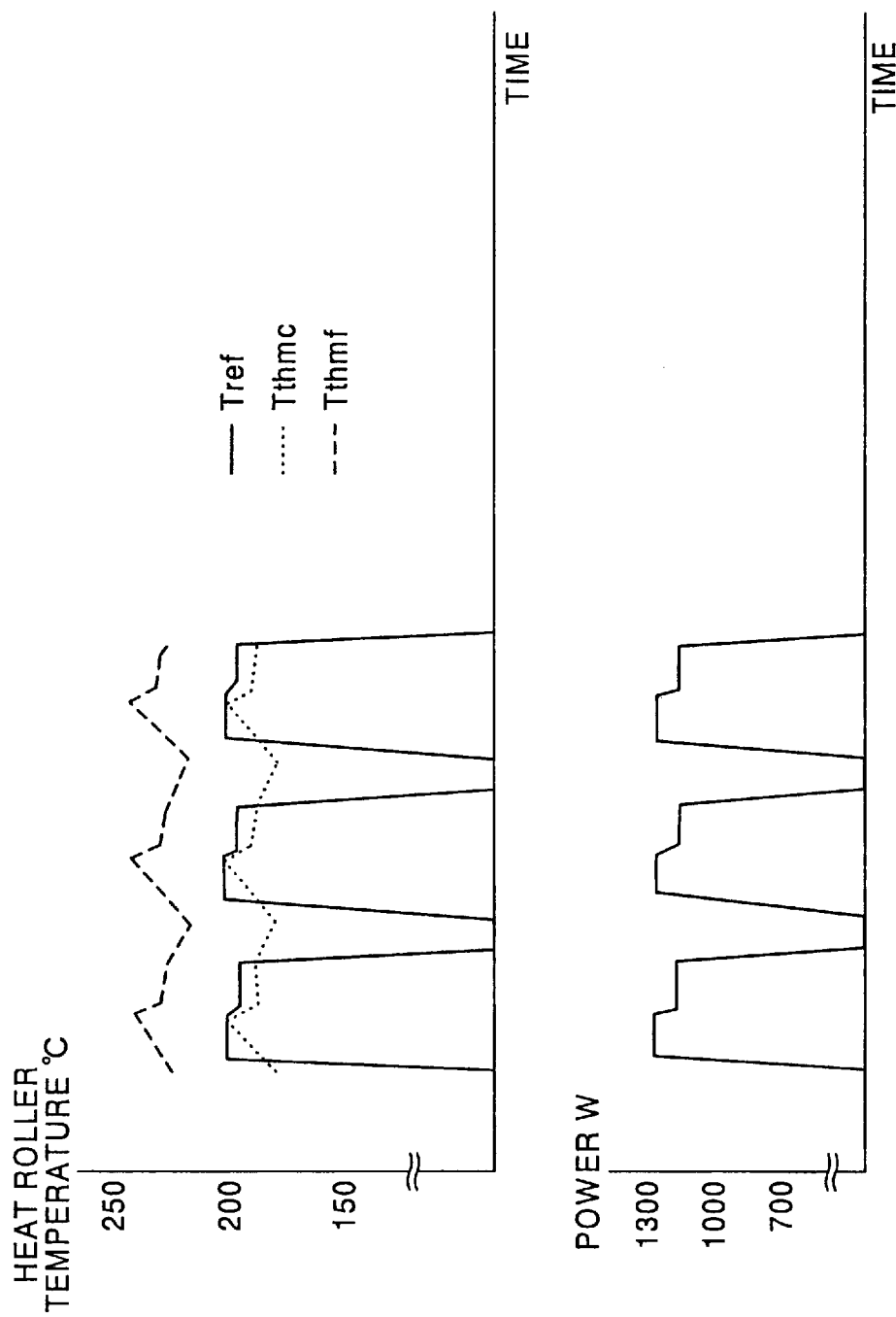
FIGS. 14A and 14B are graphs showing changes in the fixing control temperature and the thermistor detection temperature when fixing control related to this embodiment is performed.

Also, when the power supply is repetitively turned on and off such as in initial image adjustment of the electrophotographic system as shown in FIGS. 14A and 14B, end portions of the heat roller 2 are not cooled but held at 200° C. or more. This poses a problem of temperature variations.

When temperature switching control is performed in accordance with this embodiment, a temperature rise in the end portions of the heat roller 2 is prevented. This eliminates the problem of temperature variations.

Figure 15:
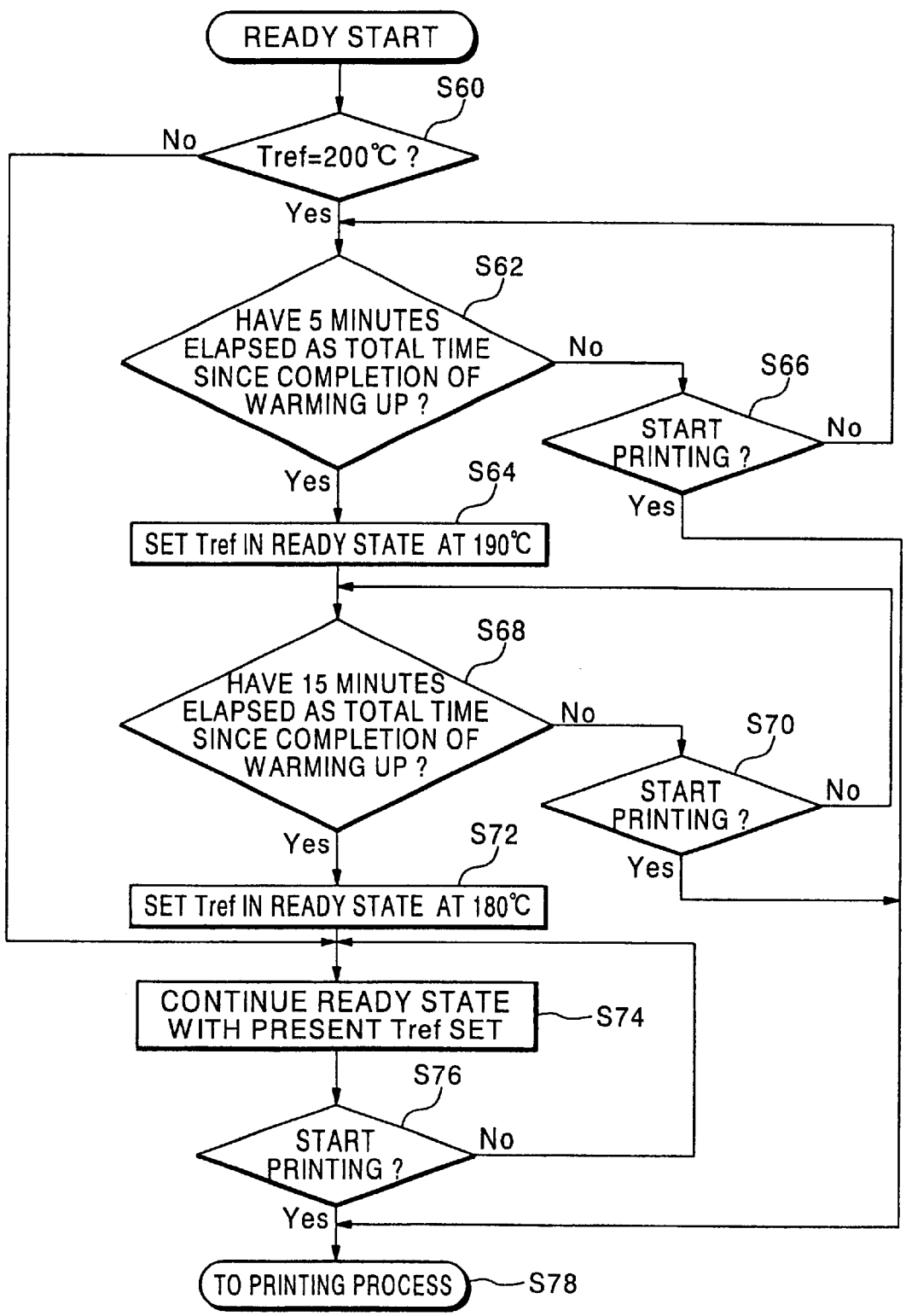
FIG. 15 is a flow chart showing the procedure of ready control of this embodiment.

(2) Ready Control
2-1) Ready Start Control
  Supply power: 700 W
  Fixing control temperature Tref: 200° C.
  Motor: OFF, Heat roller: Stopped
2-2) Read Drop Control
  Supply power: 700 W
  Motor: OFF, Heat roller: Stopped
2-3) Temperature Switching Control
  In the ready state, the fixing control temperature Tref is changed in accordance with the thermistor sensing temperatures Tthmc and Tthmf.
  If the environmental temperature is 16° C. or less, it is determined that the environment is a low-temperature one, so a threshold value ta and the fixing control temperature Tref are changed accordingly.
2-4) Environmental Threshold Value Control
  As described above, the environmental temperature is sensed by the thermistor placed near the photosensitive drum. In the ready state, therefore, a temperature higher than the actual environmental temperature is sensed because the machine temperature rises.
  Accordingly, in the ready state an environmental temperature threshold value tc is raised 1° C. whenever one hour elapses: tc=16(° C.)+1(° C.)* ready elapsed time (h).
  This threshold value setting change is performed until tc=20(° C.).
  The procedure of control in the ready state is shown in steps S44 to S58 of FIG. 9 and in FIG. 15.
  In step S44 of FIG. 9, whether the drum thermistor temperature exceeds 16° C. is checked. If this temperature exceeds 16° C., it is determined that the environment is a normal one, and the flow advances to step S46. If the temperature does not exceed 16° C., it is determined that the environment is a low-temperature one, and the flow advances to step S52.
  In step S46, whether the thermistor temperature Tthmf is less than 170° C. (=threshold value ta) is checked. If this temperature Tthmf is less than 170° C., in step S48 the fixing control temperature Tref in the ready state is set at 200° C. If the temperature Tthmf is 170° C. or more, in step S50 the fixing control temperature Tref in the ready state is set at 180° C.
  In a low-temperature environment in which the drum thermistor temperature is 16° C. or less, the flow advances to step S52 to check whether the thermistor temperature Tthmf is less than 185° C. (=threshold value ta) is checked. If this temperature Tthmf is less than 185° C., in step S54 the fixing control temperature Tref in the ready state is set at 200° C. If the temperature Tthmf is 185° C. or more, in step S56 the fixing control temperature Tref in the ready state is set at 190° C. The flow then advances from step S48, S50, S54, or S56 to a ready process in step S58.
  In step S60 of FIG. 15, whether the fixing control temperature Tref is 200° C. is checked.
  If this temperature Tref is 200° C., the flow advances to step S62; if not, the flow advances to step S74.
  In step S62, whether 5 minutes have elapsed after the completion of warming up is checked. If YES in step S62, in step S64 the temperature Tref in the ready state is set at 190° C. If NO in step S62, in step S66 whether printing is to be started is checked. If YES in step S66, the flow advances to a printing process in step S78. If NO in step S66, the flow returns to step S62.
  If in step S64 the fixing control temperature Tref is set at 190° C., in step S68 whether 15 minutes have elapsed after the completion of warming up is checked. If YES in step S68, in step S72 the fixing control temperature Tref in the ready state is set at 180° C., and the flow advances to step S74.
  If NO in step S68, in step S70 whether printing is to be started is checked. If YES in step S70, the flow advances to the printing process in step S78. If NO in step S70, the flow returns to step S62.
  In step S74, the ready state is continued while the fixing control temperature Tref is set at the present value. In step S76, whether printing is to be started is checked. If YES in step S76, the flow advances to step S78. If NO in step S76, the flow returns to step S74.
  The temperature relationships in the above ready control are as follows.
  In normal environment: Threshold value ta=170(° C.)

| | |
|---|---|
| If Tthmf or Tthmc < ta | :Tref = 200° C. from the beginning of ready to the elapse of 5 min<br>:Tref = 190° C. from the elapse of 5 min to the elapse of 15 min<br>:Tref = 180° C. after the elapse of 15 min |
| If ta ≦ Tthmf and Tthmc | :Tref = 180° C. from the beginning of ready to the elapse of 5 min<br>:Tref = 180° C. from the elapse of 5 min to the elapse of 15 min<br>:Tref = 180° C. after the elapse of 15 min |
| In low-temperature environment: | Threshold value ta = 185 (° C.) |
| If Tthmf or Tthmc < ta | :Tref = 200° C. from the beginning of ready to the elapse of 5 min<br>:Tref = 200° C. from the elapse of 5 min to the elapse of 15 min<br>:Tref = 200° C. after the elapse of 15 min |
| If ta ≦ Tthmf and Tthmc | :Tref = 190° C. from the beginning of ready to the elapse of 5 min<br>:Tref = 190° C. from the elapse of 5 min to the elapse of 15 min<br>:Tref = 190° C. after the elapse of 15 min |

Figure 16A:
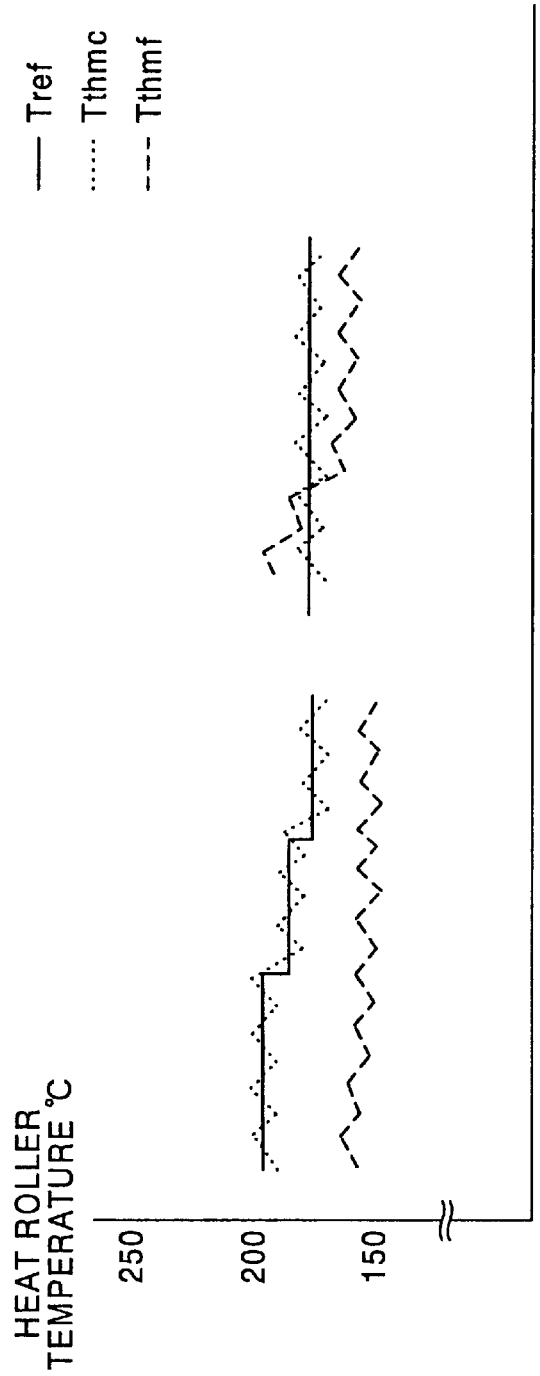
FIGS. 16A and 16B are graphs showing changes in the fixing control temperature and the thermistor detection temperature when the ready control is performed.
Figure 16B:
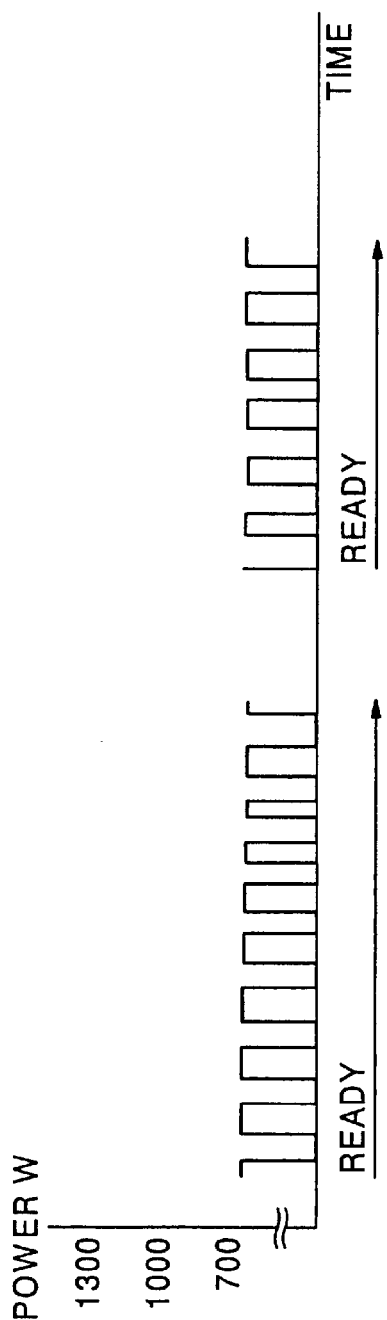
Figures 17A, 17B:
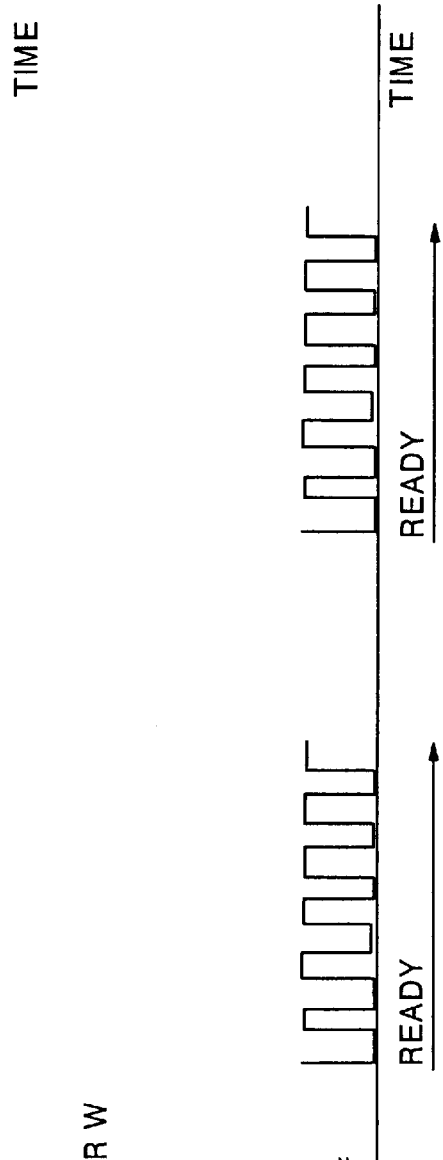
FIGS. 17A and 17B are graphs showing changes in the fixing control temperature and the thermistor detection temperature when the ready control is performed.

In IH fixing, the two ends of the heat roller are difficult to heat in the ready state, so the temperature of these end portions is lower than that of the central portion. On the other hand, in the ready state after printing is completed, the temperature of the two ends must be lowered because it rises, unlike the central portion deprived of heat by the sheet P.
  By the ready control according to this embodiment, as shown in FIGS. 16A and 16B, temperature variations of the heat roller can be suppressed by changing the fixing control temperature Tref on the basis of the thermistor temperatures Tthmc and Tthmf.
  Even in a low-temperature environment, good fixing properties can be obtained by switching the fixing control temperatures as shown in FIGS. 17A and 17B by the ready control described above.
  In an apparatus related to the present invention, if printing is started while the thermistor sensing temperatures Tthmc and Tthmf are not within the printing permissible temperature range, pre-run rotation must be performed until these temperatures fall within this temperature range. This prolongs the first print time.
  In this embodiment, however, if the thermistor sensing temperatures Tthmc and Tthmf are not within the printing permissible temperature range, the fixing control temperature Tref is changed so that these temperatures fall within this range.

Figure 18A:
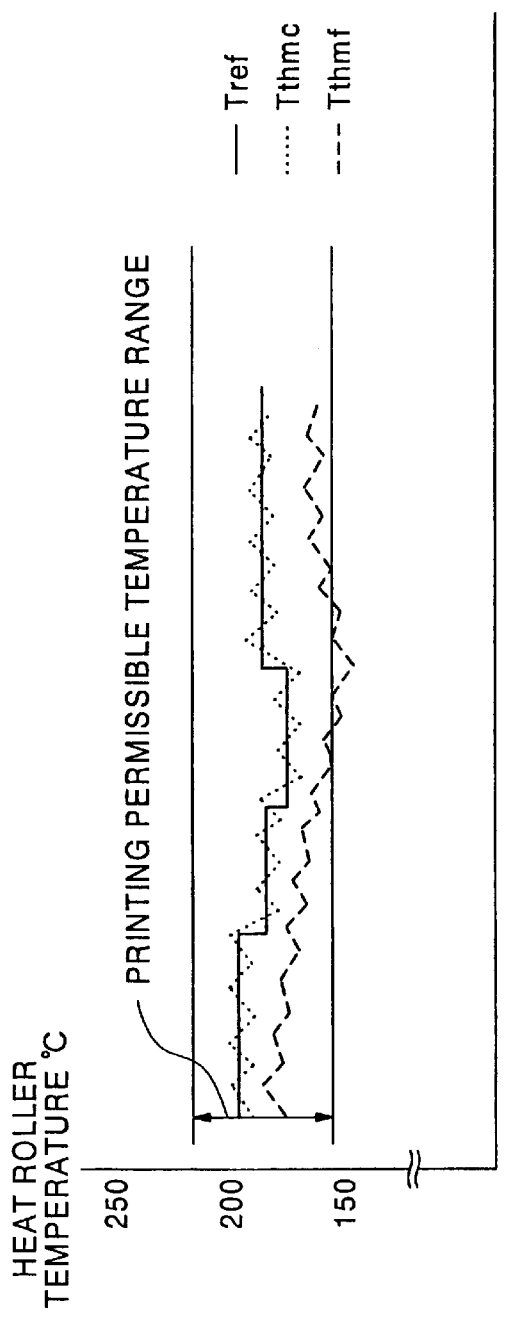
FIGS. 18A and 18B are graphs showing changes in the fixing control temperature and the thermistor detection temperature when the ready control is performed.
Figure 18B:
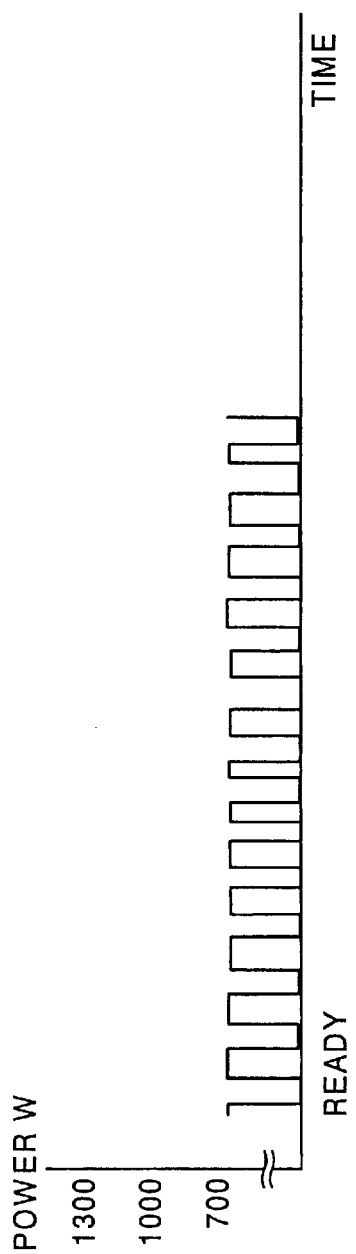

For example, as shown in FIGS. 18A and 18B, when the end portion temperature (temperature Tthmf) of the heat roller 2 is lower than the printing permissible temperature range, the fixing control temperature Tref is raised 10° C. The end portion temperature can be controlled to fall within this range by sensing the temperature every 5 minutes.

(3) Printing Control

Supply power: 900 W

Motor ON, Heat roller rotated Printing set temperatures

| Plain paper (normal environment) mode: | 200° C. |
|---|---|
| Plain paper (low-temperature environment) mode: | 200° C. |
| OHP mode: | 200° C. |
| Thick paper mode: | 200° C. |

Figure 19:
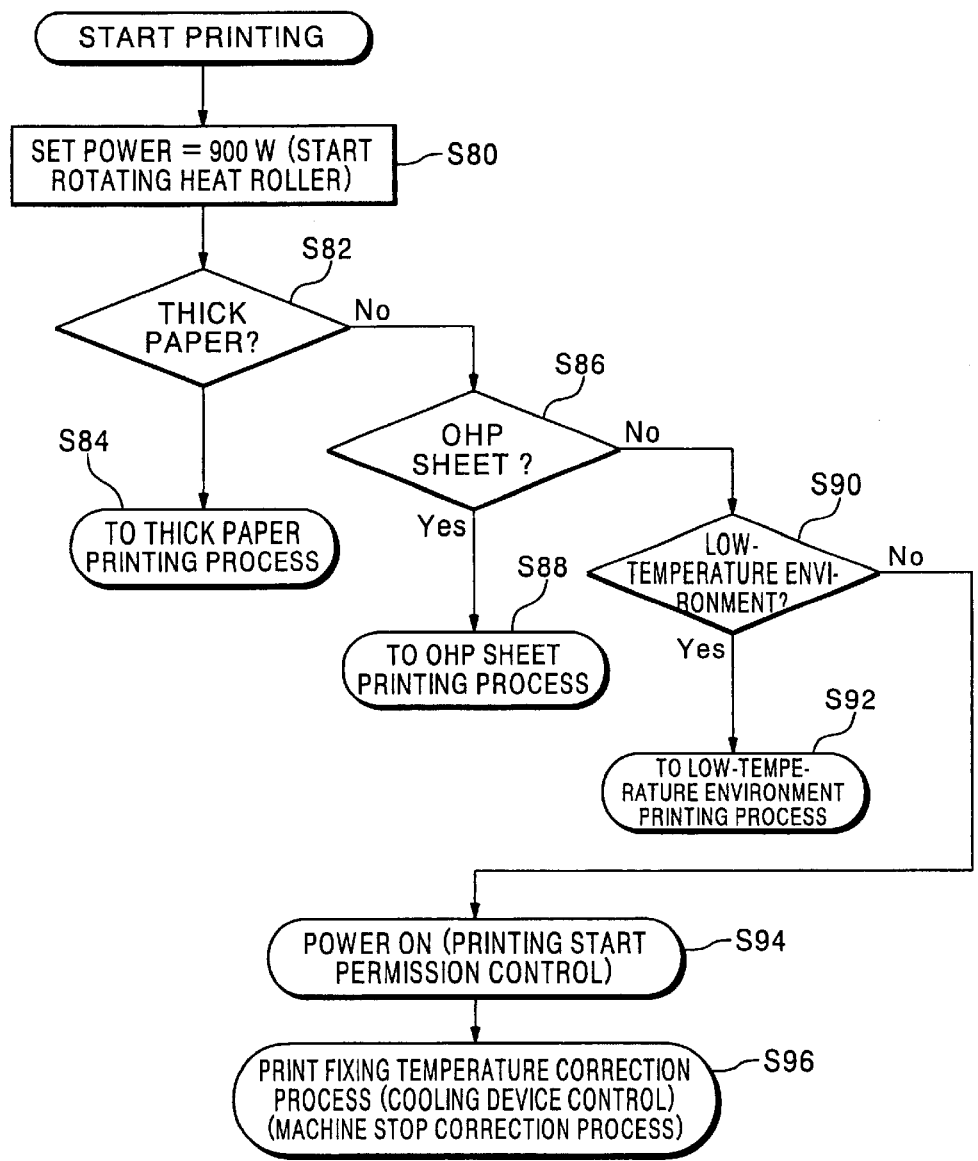
FIG. 19 is a flow chart showing a control procedure at the start of printing of this embodiment.

In this processing, as shown in FIG. 19, in step S80 the supply power is set at 900 W and the rotation of the heat roller is started.

In step S82, S86, or S90, determination for a thick paper mode, OHP mode, or low-temperature environment, respectively, is performed. In the thick paper mode, OHP mode, or low-temperature environment, the flow advances to step S84, S88, or S92 to proceed to a thick paper printing process, OHP printing process, or low-temperature environment printing process, respectively. In none of these cases, the flow advances to step S94 to perform the following printing start permission control. In addition, as will be described later, in step S96 a print fixing temperature correction process concerning a cooling device control process or electrophotographic system stop correction process is performed as needed.

3-1-2) Printing Start Permission Control

If the center thermistor temperature Tthmc and the front thermistor temperature Tthmf are within the following temperature range at the start of printing, the start of a printing operation is permitted. If one of these temperatures falls outside this range, a pre-run operation is performed until the temperature falls within the range.

| Plain paper (normal environment) mode: | 160° C. $\leq$ Tthmc and Tthmf $\leq$ 220° C. |
|---|---|
| Plain paper (low-temperature environment) mode: | 175° C. $\leq$ Tthmc and Tthmf $\leq$ 220° C. |
| OHP mode: | 170° C. $\leq$ Tthmc and Tthmf $\leq$ 230° C. |
| Thick paper mode: | 180° C. $\leq$ Tthmc and Tthmf $\leq$ 230° C. |

Figure 20:
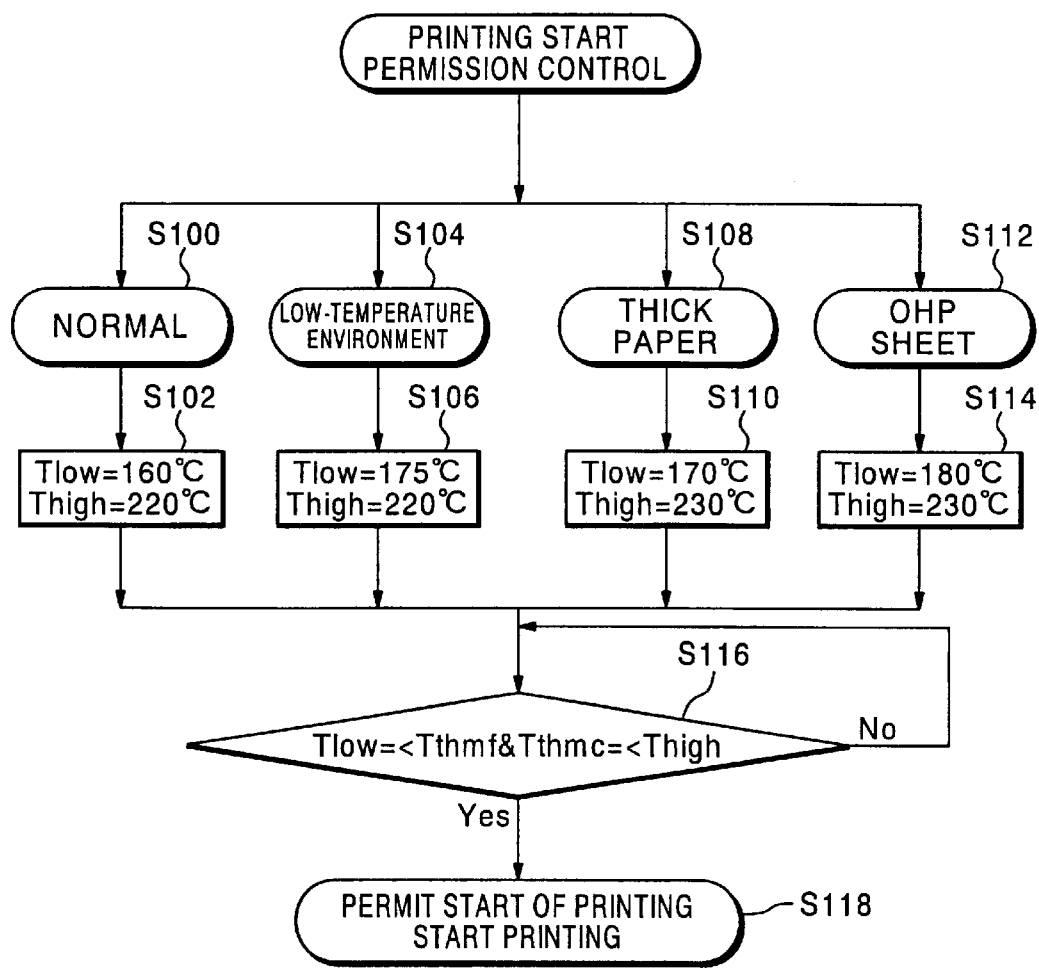
FIG. 20 is a flow chart showing the procedure of printing start permission control of this embodiment.

FIG. 20 shows the procedure of this printing start permission control. In step S100, S104, S108, or S112, control in the plain paper (normal environment) mode, plain paper (low-temperature environment) mode, thick paper mode, or OHP mode, respectively, is started.

In the plain paper (normal environment) mode, plain paper (low-temperature environment) mode, thick paper mode, and OHP mode, a lowest temperature Tlow and a highest temperature Thigh of the thermistor temperatures Tthmc and Tthmf are as described in steps S102, S106, S110, and S114, respectively.

In step S116, whether the thermistor temperatures Tthmc and Tthmf are within the range from the lowest temperature Tlow to the highest temperature Thigh in the corresponding mode is checked. If YES in step S116, the start of printing is permitted in step S118. If the temperatures Tthmc and Tthmf fall outside this range, the flow returns to step S116.

3-1-3) Temperature Switching Control at Start of Printing

The fixing control temperature Tref is changed in accordance with the thermistor sensing temperatures Tthmc and Tthmf at the start of printing.

Also, a threshold value td is changed in accordance with the print mode.

Plain paper (normal environment) mode:
td=170° C., if Tthmf or Tthmc<td, td is changed to 200° C. when 2 seconds have elapsed after Tref=205° C.
if td$\leq$Tthmf and Tthmc, td is changed to 180° C. when 2 seconds have elapsed after Tref=180° C.

Plain paper (low-temperature environment) mode:
td=180° C., if Tthmf or Tthmc<td, td is changed to 200° C. when 2 seconds have elapsed after Tref=210° C.
if td$\leq$Tthmf and Tthmc, td is changed to 190° C. when 2 seconds have elapsed after Tref=190° C.

OHP mode:
td=180° C., if Tthmf or Tthmc<td, td is changed to 200° C. when 2 seconds have elapsed after Tref=205° C.
if td$\leq$Tthmf and Tthmc, td is changed to 200° C. when 2 seconds have elapsed after Tref=200° C.

Thick paper mode:
td=180° C., if Tthmf or Tthmc<td, td is changed to 200° C. when 2 seconds have elapsed after Tref=210° C.
if td$\leq$Tthmf and Tthmc, td is changed to 200° C. when 2 seconds have elapsed after Tref=200° C.

Figure 21:
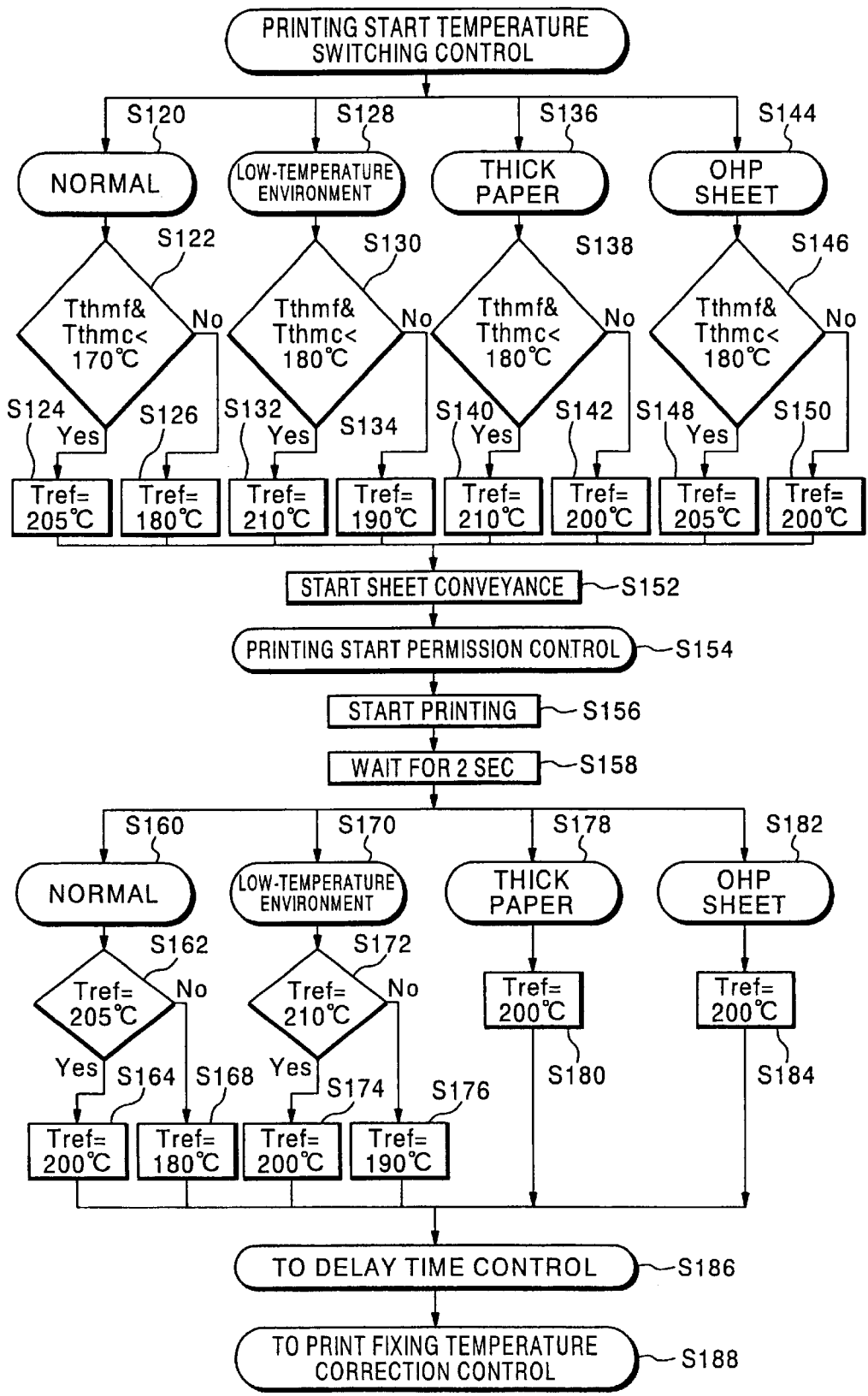
FIG. 21 is a flow chart showing the procedure of temperature switching control at the start of printing of this embodiment.

The procedure of this control is as shown in FIG. 21.

In step S120, S128, S136, or S144, control in the plain paper (normal environment) mode, plain paper (low-temperature environment) mode, thick paper mode, or OHP mode, respectively, is started. The threshold value td in each of these modes is as described above. In step S122, S130, S138, or S146, whether the thermistor temperatures Tthmc and Tthmf are less than this threshold value td is checked. If both of these temperatures Tthmc and Tthmf are less than the threshold value td, the fixing control temperature Tref is set at 205° C., 210° C., 210° C., or 205° C. in step S124, S132, S140, or S148, respectively. If both the temperatures Tthmc and Tthmf are equal to or higher than the threshold value td, the fixing control temperature Tref is set at 180° C., 190° C., 200° C., or 200° C. in step S126, S134, S142, or S150, respectively, in each corresponding mode.

In step S152, the conveyance of the sheet P is started. In step S154, printing start permission control is performed. In step S156, printing is started. In step S158, the operation waits for 2 seconds.

In step S160, S170, S178, or S182, control in the plane paper (normal environment) mode, plain paper (low-temperature environment) mode, thick paper mode, or OHP mode, respectively, is started.

In the plain paper (normal environment) mode, whether the fixing control temperature Tref is 250° C. is checked in step S162. If this temperature Tref is 205° C., the temperature is changed to 200° C. in step S164. If the temperature Tref is not 205° C., this temperature is changed to 180° C. in step S168.

In the plain paper (low-temperature environment) mode, whether the fixing control temperature Tref is 210° C. is checked in step S172. If this temperature Tref is 210° C., the temperature is changed to 200° C. in step S174. If the temperature Tref is not 210° C., this temperature is changed to 190° C. in step S176.

In the thick paper mode, the fixing control temperature Tref is set at 200° C. in step S180. In the OHP mode, the fixing control temperature Tref is set at 200° C. in step S184. In this way, the fixing control temperature is not largely changed for thick paper or OHP because heat is taken by the sheet unlike a plain paper sheet.

After that, the flow advances to delay time control (step S186) and print fixing temperature correction control (step S188).

Figure 22A:
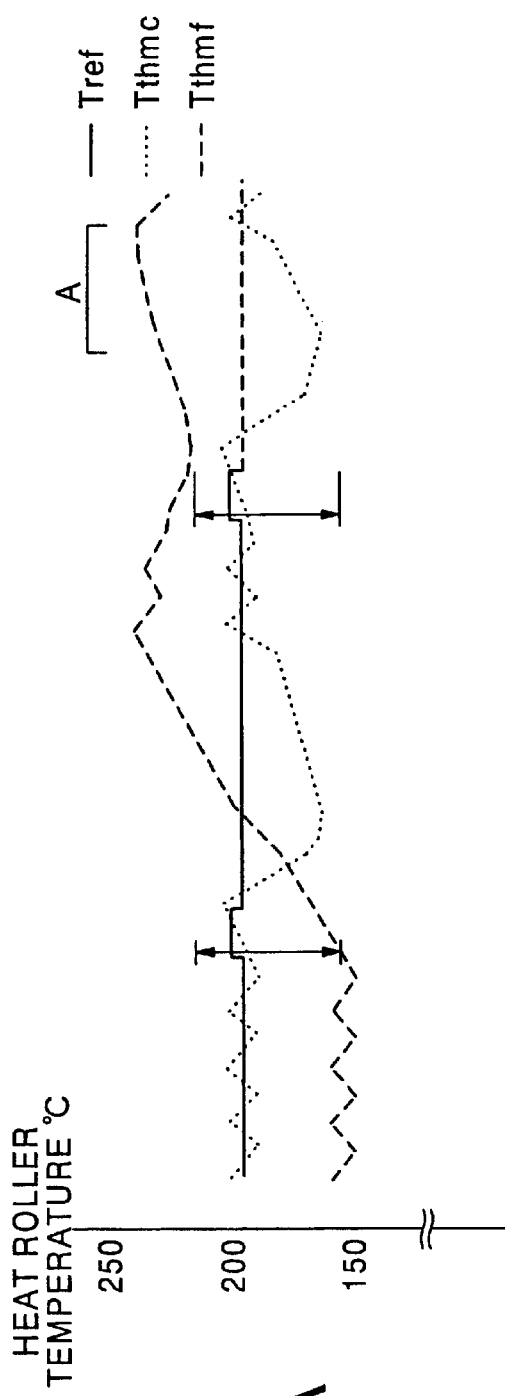
FIGS. 22A and 22B are graphs showing changes in the fixing control temperature and the thermistor detection temperature when printing is started under fixing control related to the present invention.
Figure 22B:
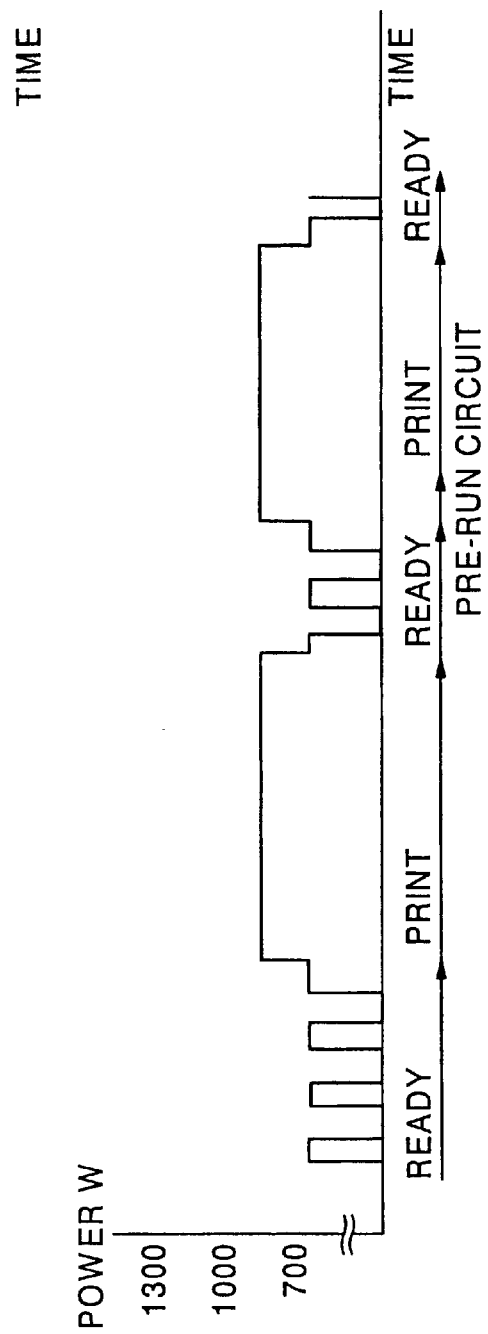

If normal printing start permission control as disclosed in references (e.g., Japanese Patent Laid-Open Nos. 11-234086 and 11-246233) is performed in the plain paper mode, the thermistor temperatures Tthmc and Tthmf and the fixing control temperature Tref change as shown in FIGS. 22A and 22B. By this control, even when the end portion temperature of the heat roller has risen after the completion of printing, the generation of high-temperature offset is prevented by pre-run rotation when the next printing is started.

When printing is repetitively performed, however, the heat roller end portion temperature Tthmf is held high if this printing start permission control alone is performed. Also, in the thick paper mode or OHP mode, offset occurs as indicated by a region A in FIG. 22A if non-offset temperature regions are different.

Figure 23A:
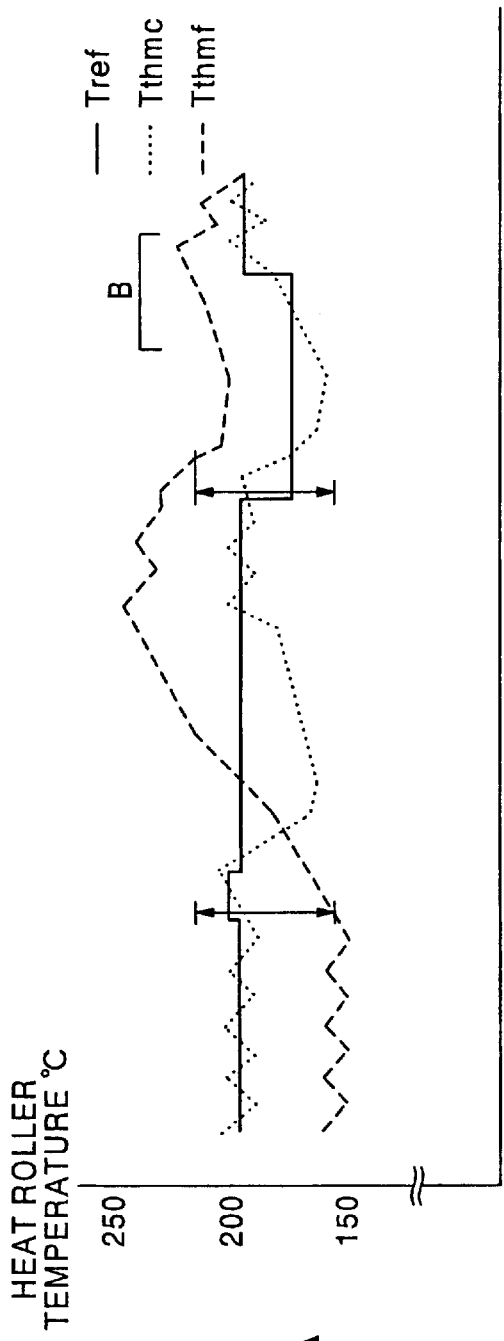
FIGS. 23A and 23B are graphs showing changes in the fixing control temperature and the thermistor detection temperature at the start of printing of this embodiment.
Figure 23B:
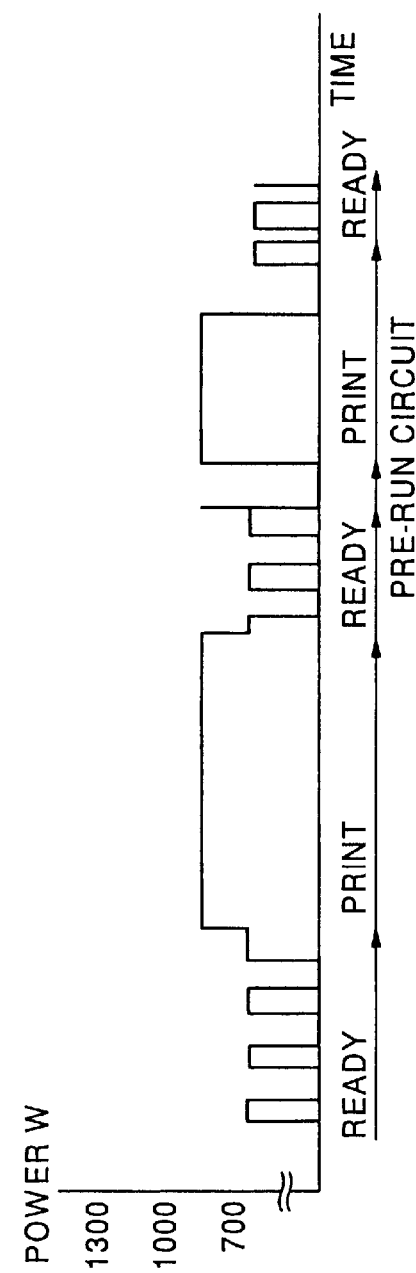

In accordance with this embodiment, therefore, after printing is permitted the printing start temperature switching control is performed following the above-mentioned procedure. Consequently, as indicated by a region B in FIG. 23A, a rise of the heat roller end portion temperature Tthmf can be suppressed.

In addition, even in intermittent printing (repetition of printing of one sheet, ready of 5 sec, and printing of the next sheet), for example, good results as shown in FIGS. 24A and 24B were obtained by performing the printing start temperature switching control after printing was permitted.

Figure 25A:
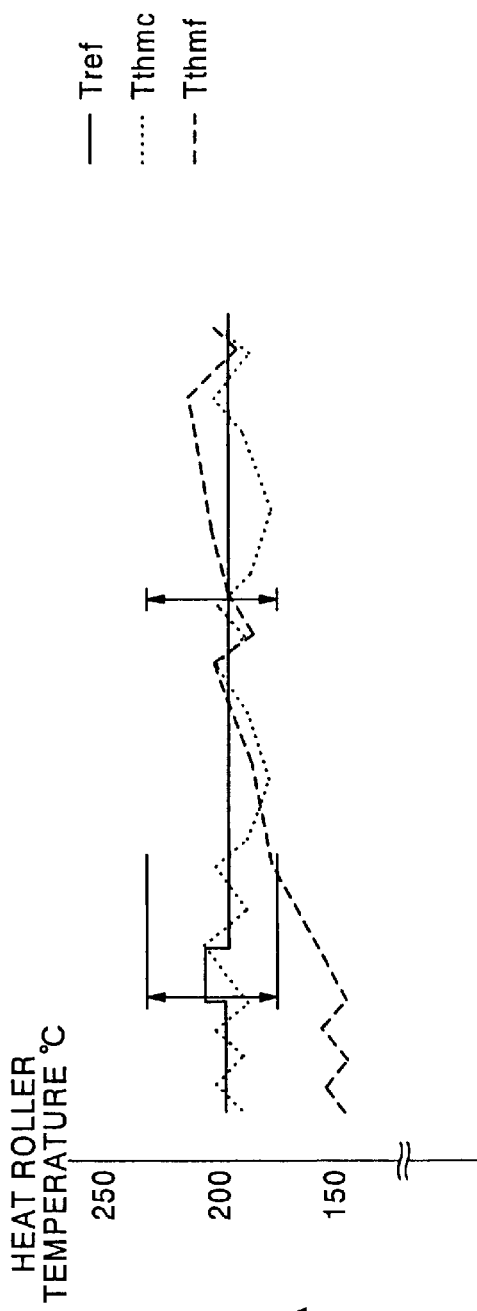
FIGS. 25A and 25B are graphs showing changes in the fixing control temperature and the thermistor detection temperature when thick paper printing of this embodiment is performed.
Figure 25B:
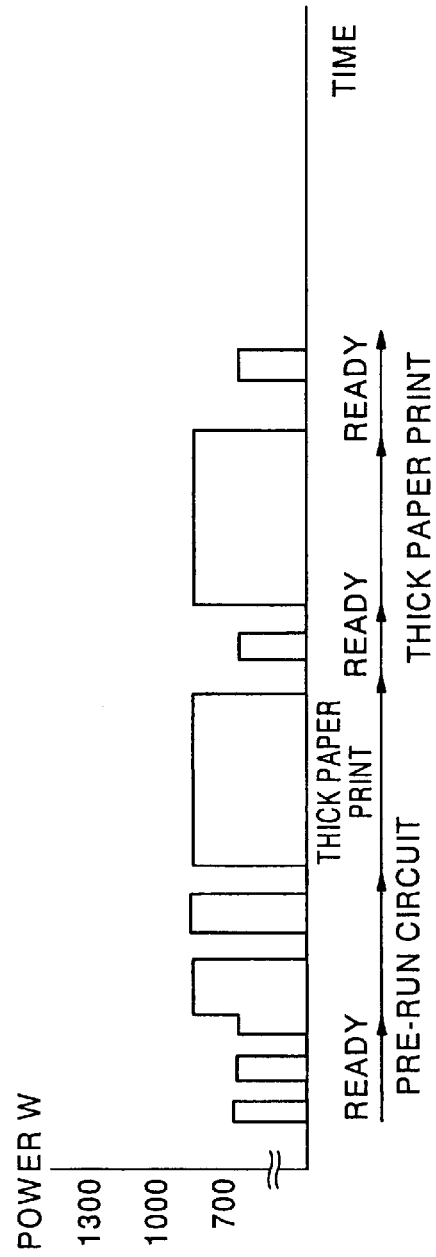

Also, in the thick paper mode, good results as shown in FIGS. 25A and 25B were obtained by performing the printing start temperature switching control after printing was permitted.

3-2) During Printing
3-2-1) Print Fixing Temperature Correction Control

If during printing the front thermistor sensing temperature Tthmf is 190° C. or more, the fixing control temperature Tref is changed to be lower than the set temperature by 5° C. This change is repeated every 5 seconds. If the sensing temperature Tthmf is still 190° C. or more, the process is repeated until the fixing control temperature Tref and a lower-limiting value te become 165° C.

In the low-temperature environment, however, the threshold value te is limited to 175° C.

Also, this lower-limiting value te is changed in accordance with the print mode.

In this case, the threshold value te and the fixing control temperature Tref are changed in accordance with each print mode as follows.

Figure 26:
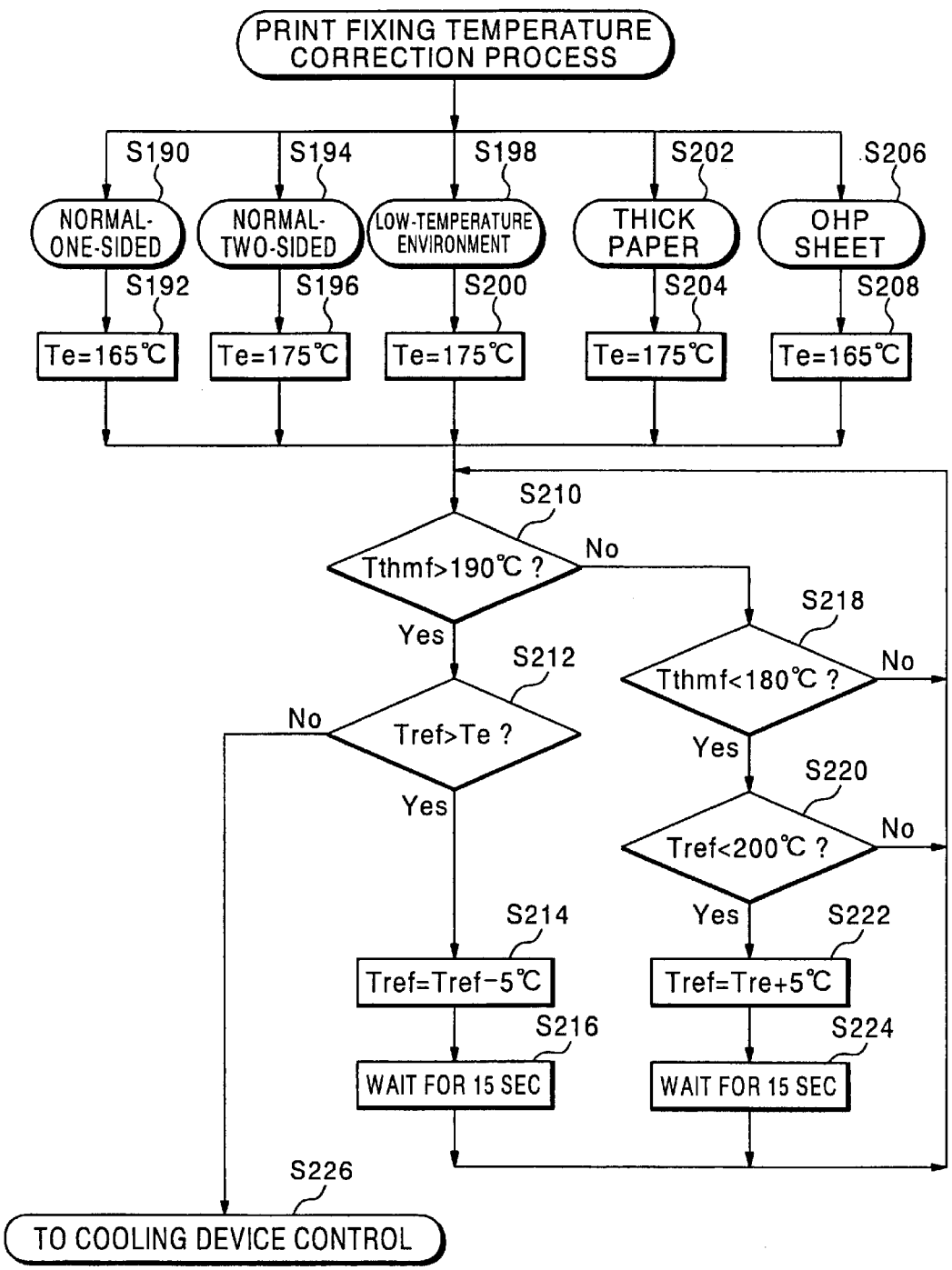
FIG. 26 is a flow chart showing the procedure of print fixing temperature correction control of this embodiment.

Plain paper (normal environment, one-sided) mode: Threshold value te=165° C., fixing control temperature Tref=200° C.–190° C.–185° C.–180° C.–175° C.–170° C.–165° C.=threshold value te Plain paper (normal environment, two-sided) mode:
Threshold value te=175° C., fixing control temperature Tref=200° C.–190° C.–185° C.–180° C.–175° C.=threshold value te Plain paper (low-temperature environment) mode: Threshold value te=175° C., fixing control temperature Tref=200° C.–190° C.–185° C.–180° C.–175° C.=threshold value te OHP mode: Threshold value te=165° C., fixing control temperature Tref=200° C.–190° C.–185° C.–180° C.–175° C.–170° C.–165° C.=threshold value te Thick paper mode: Threshold value te=175° C., fixing control temperature Tref=200° C.–190° C.–185° C.–180° C.–175° C.=threshold value te The procedure of this control is as shown in FIG. 26. In step S190, S194, S198, S202, or S206, control of the plain paper (normal environment, one-sided) mode, plain paper (normal environment, two-sided) mode, plain paper (low-temperature environment) mode, or OHP mode, respectively, is started. In step S192, S196, S200, S204, or S208, the threshold value te in each corresponding mode is set at 165° C., 175° C., 175° C., 175° C., or 165° C., respectively.

If in step S210 the thermistor temperature Tthmf exceeds 190° C., the flow advances to step S212; if not, the flow advances to step S218. In step S212, whether the fixing control temperature Tref exceeds the threshold value te is checked. If YES instep S212, the flow advances to step S214. If NO in step S212, the flow advances to step S226 to proceed to control of a cooling device.

In step S214, the fixing control temperature Tref is lowered by 5° C. After the operation waits for 15 sec in step S216, the flow returns to step S210.

In step S218, whether the thermistor temperature Tthmf is less than 180° C. is checked. If this temperature Tthmf is less than 180° C., the flow advances to step S220. If the temperature Tthmf is 180° C. or more, the flow returns to step S210.

If in step S220 the fixing control temperature Tref is less than 200° C., the flow advances to step S222. If this temperature Tref is 200° C. or more, the flow returns to step S210.

In step S222, the fixing control temperature Tref is raised 5° C. After the operation waits for 15 sec in step S224, the flow returns to step S210.

When printing is to be performed on sheets of, e.g., A4-R size in the apparatus related to the present invention, the heat roller end portion temperature Tthmf immediately rises because no heat is taken by the sheets.

In contrast, in this embodiment as described above, if the front thermistor temperature Tthmf is 180° C. or less during printing or at the end of printing, the fixing control temperature Tref is raised 5° C. This process is repeated every 15 seconds. If the temperature Tthmf is still 180° C. or less, the process is repeated until the fixing control temperature Tref becomes equal to the printing set temperature.

Figure 27:
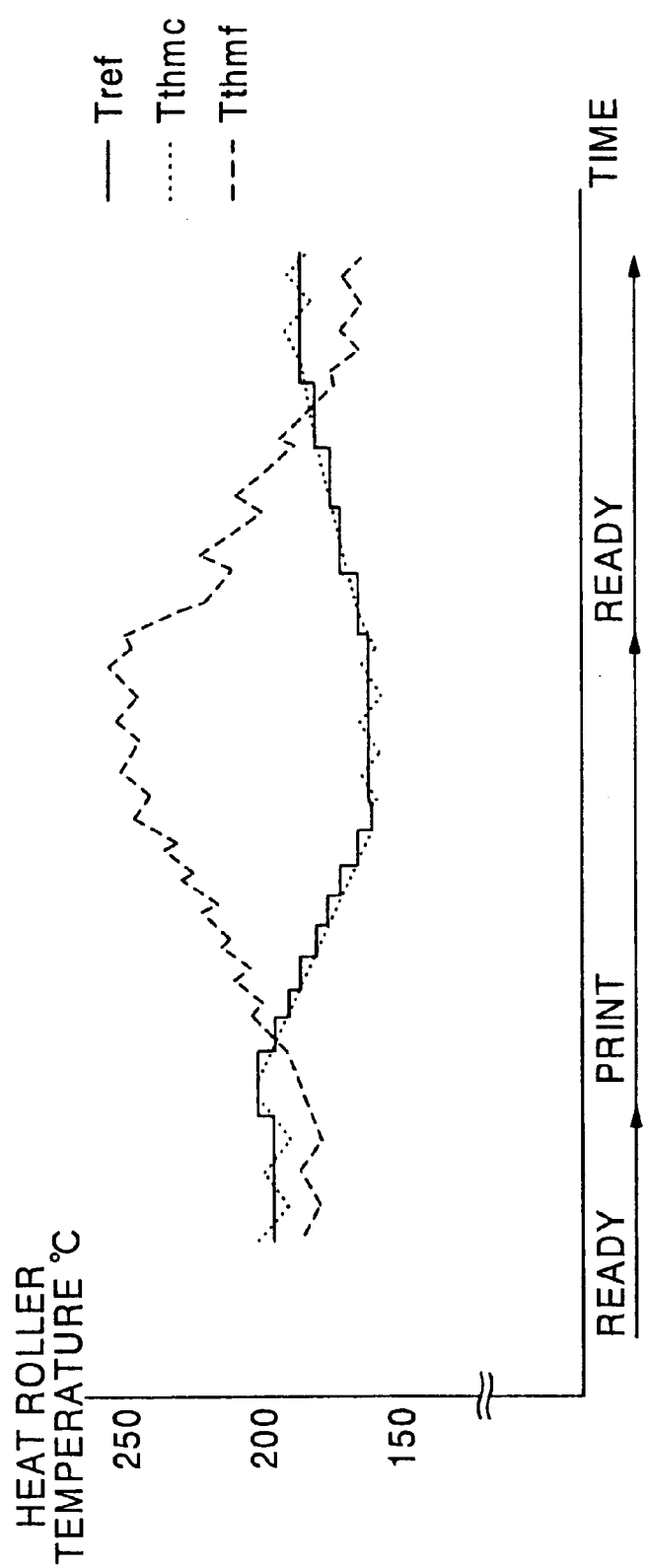
FIG. 27 is a graph showing changes in the fixing temperature and the thermistor detection temperature when the print fixing temperature correction control of this embodiment is performed.

By performing this control, as shown in FIG. 27, a temperature rise can be suppressed so as not to exceed 265° C. even when printing is performed on a maximum of 10,000 sheets in succession.

Figure 28:
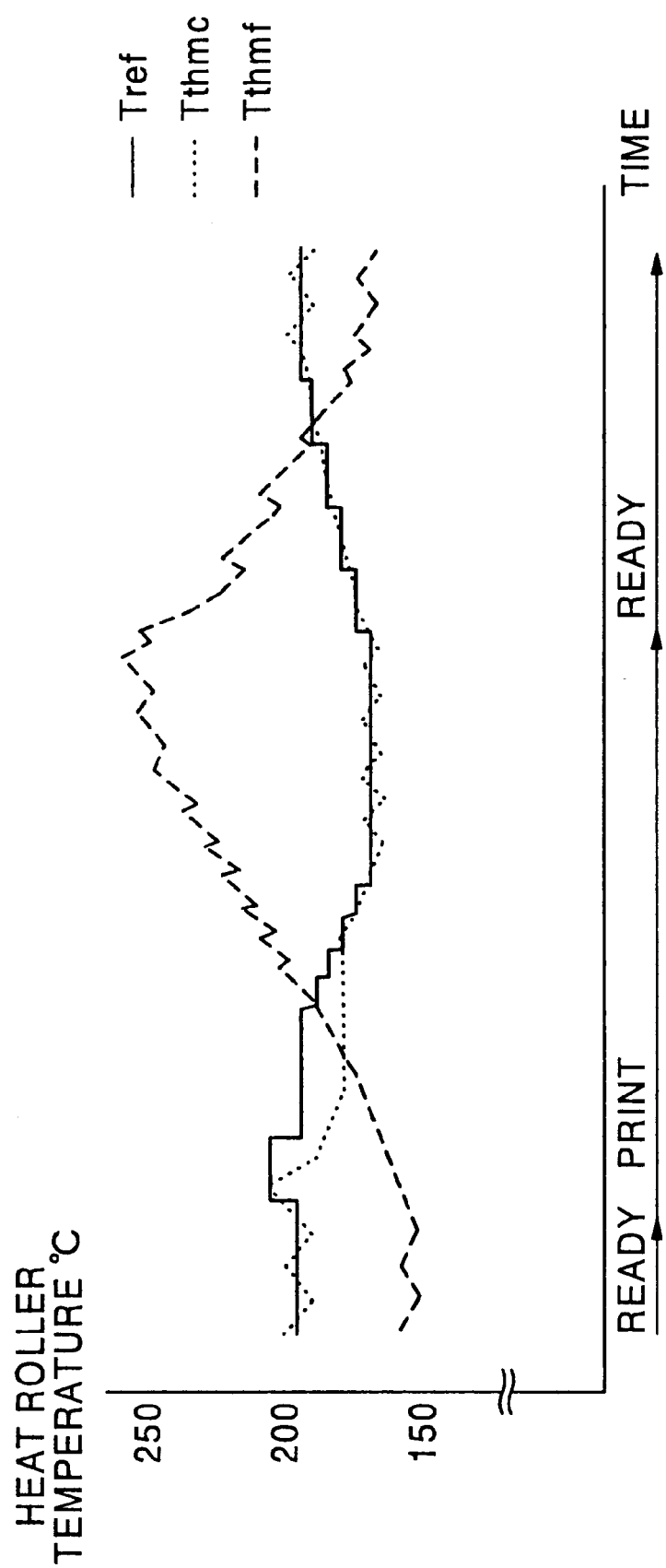
FIG. 28 is a graph showing changes in the fixing temperature and the thermistor detection temperature when the print fixing temperature correction control of this embodiment is performed in a low-temperature environment.

Furthermore, by changing the threshold value te in the low-temperature environment, as shown in FIG. 28, a temperature rise is suppressed even when the fixing control temperature Tref is lowered. Since no inferior fixing takes place, good fixing properties can be obtained.

3-2-2) Delay Time Control

In accordance with the front thermistor sensing temperature Tthmf at the start of printing, a blank time T to the start of print fixing temperature correction control is changed as follows.

Front thermistor sensing temperature Tthmf

| 160° C. or less: | Blank time T = 20 sec |
| 160 to 165° C.: | Blank time T = 15 sec |
| 165 to 170° C.: | Blank time T = 10 sec |
| 170° C. or more: | Blank time T = 0 |

Figure 29:
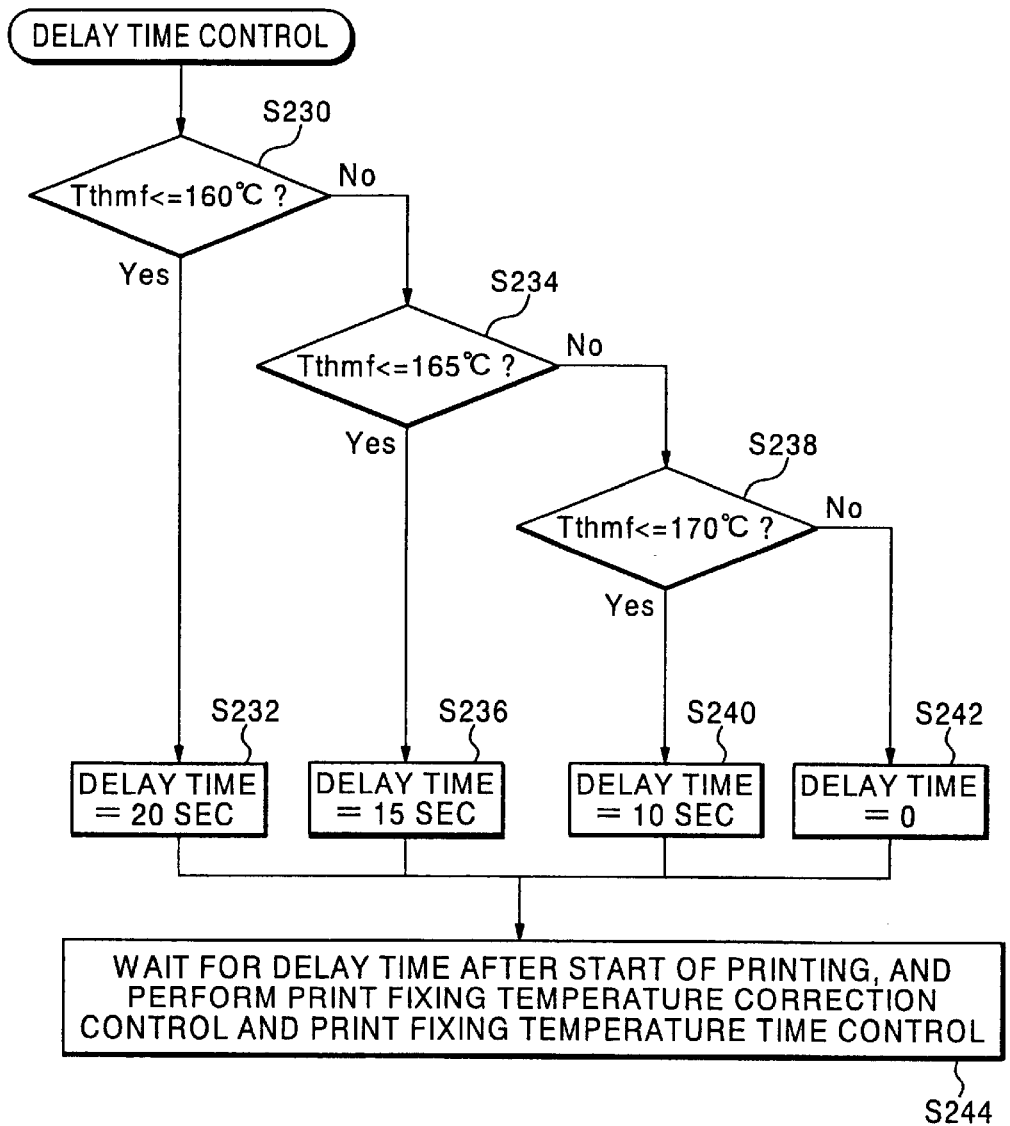
FIG. 29 is a flow chart showing the procedure of delay time control of this embodiment.

The procedure of this delay time control is as shown in FIG. 29. In step S230, whether the thermistor temperature Tthmf is 160° C. or less is checked. If this temperature Tthmf is 160° C. or less, the delay time is set to 20 sec in step S232. If the temperature Tthmf exceeds 160° C., the flow advances to step S234 to check whether the thermistor temperature Tthmf is 165° C. or less is checked. If this temperature Tthmf is 165° C. or less, the delay time is set to 15 sec in step S236. If the temperature Tthmf exceeds 165° C., the flow advances to step S238.

In step S238, whether the thermistor temperature Tthmf is 170° C. or less is checked. If this temperature Tthmf is 170° C. or less, the delay time is set to 10 sec in step S240. If the temperature Tthmf exceeds 170° C., the delay time is set to 0 in step S242.

In step S244, the operation waits for any delay time set after the start of printing, and the flow advances to the above-mentioned print fixing temperature correction control and to print fixing temperature time control to be described later.

In the apparatus related to the present invention, when printing is to be performed on A4-R-size sheets in a ready state for the first time in the morning, the fixing roller end portion temperature Tthmf greatly rises before the press roller well warms up. Since this triggers print fixing temperature correction control, the temperature of the fixing roller lowers. Consequently, inferior fixing occurs from the 40th to 70th sheets.

Figure 30:
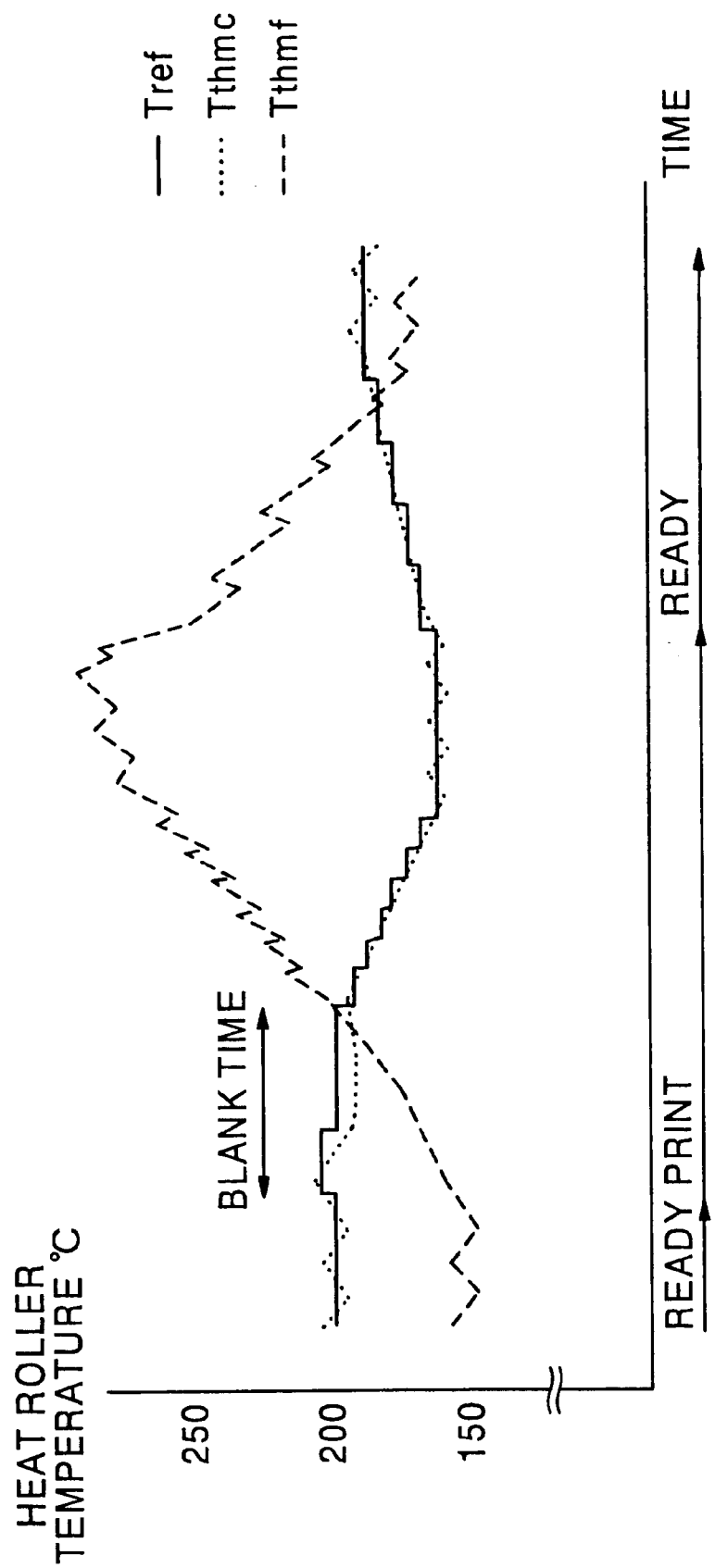
FIG. 30 is a graph showing changes in the fixing temperature and the thermistor detection temperature when the delay time control of this embodiment is performed.

In contrast, in this embodiment the delay time control described above is performed. Accordingly, as shown in FIG. 30, temperature variations are suppressed, and this prevents inferior fixing.

3-2-3) Print Fixing Temperature Time Control

The time from the start of printing is measured, and the fixing control temperature Tref is set at 190° C., 180° C., and 175° C. after the elapses of 27, 80, and 140 seconds, respectively. In this way, the print fixing temperature is corrected.

Figure 31:
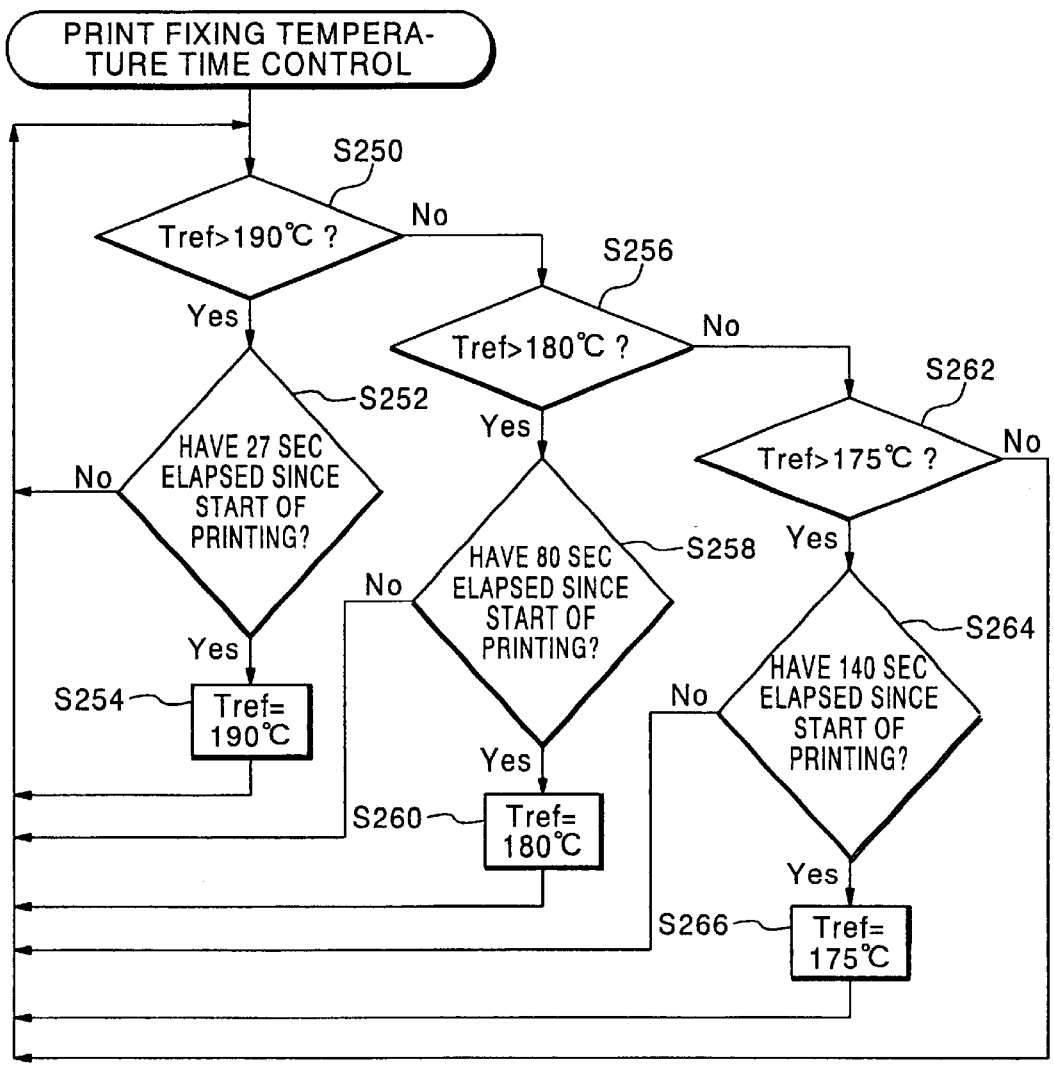
FIG. 31 is a flow chart showing the procedure of print fixing temperature time control of this embodiment.

The procedure of this print fixing temperature time control is as shown in FIG. 31. In step S250, whether the fixing control temperature Tref exceeds 190° C. is checked. If YES in step S252, the flow advances to step S252. If NO in step S252, the flow advances to step S256. If in step S252 27 seconds have elapsed after the start of printing, in step S254 the fixing control temperature Tref is set at 190° C., and the flow returns to step S250.

In step S256, whether the fixing control temperature Tref exceeds 180° C. is checked. If YES in step S256, the flow advances to step S258. If NO in step S256, the flow advances to step S262. If in step S258 80 seconds have elapsed after the start of printing, in step S260 the fixing control temperature Tref is set at 180° C., and the flow returns to step S250.

In step S262, whether the fixing control temperature Tref exceeds 175° C. is checked. If YES in step S262, the flow advances to step S264. If NO in step S262, the flow returns to step S250. If in step S264 140 seconds have elapsed after the start of printing, in step S266 the fixing control temperature Tref is set at 175° C., and the flow returns to step S250.

When printing is performed on, e.g., A3-size sheets in the apparatus related to the present invention, the fixing roller end portion temperature Tthmf slowly rises and the central portion temperature Tthmc abruptly lowers when compared to cases in which printing is performed on A4-R-size sheets. This increases temperature differences between the central portion and the end portions. If print fixing temperature correction control is started in this state, the fixing control temperature Tref takes 25 seconds to lower from 200° C. to Tthmc, during which the end portion temperature Tthmf rises.

Figure 32:
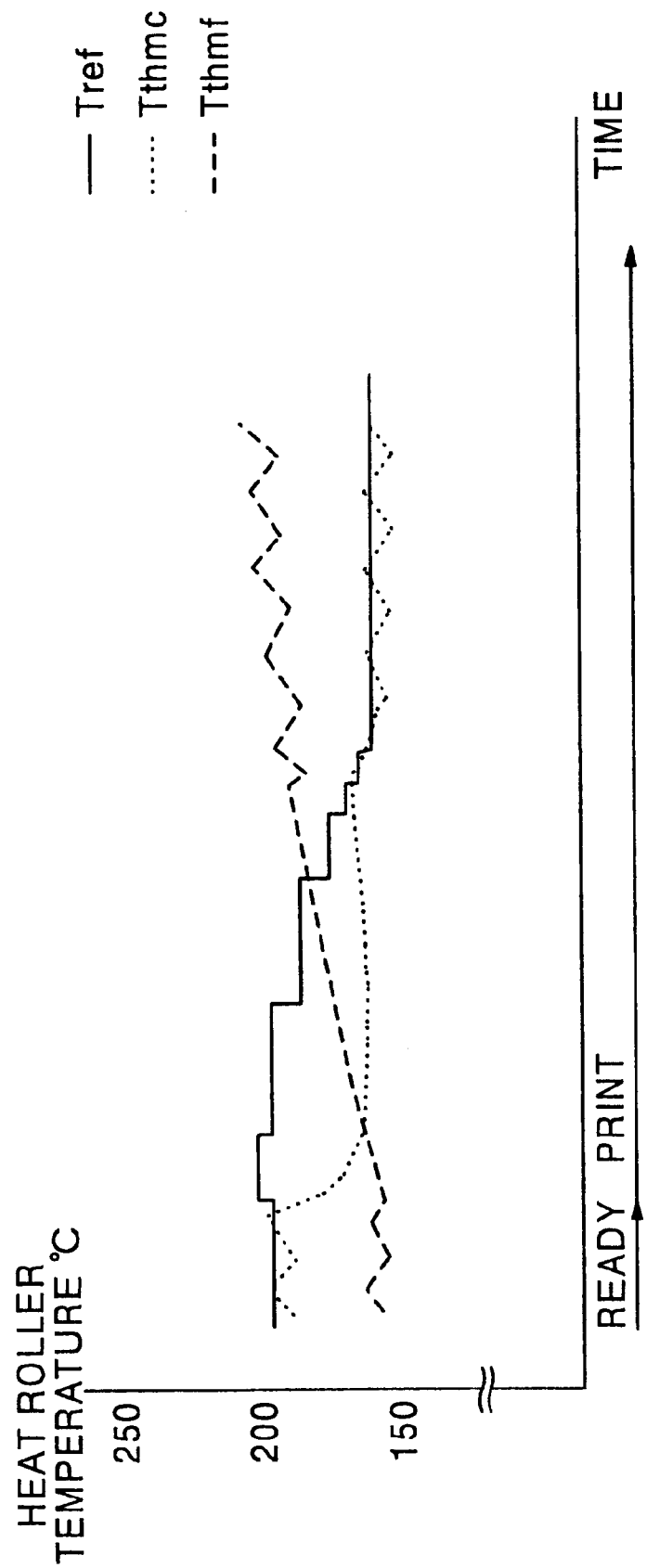
FIG. 32 is a graph showing changes in the fixing temperature and the thermistor detection temperature when the print fixing temperature time control of this embodiment is performed.

In contrast, when the print fixing temperature time control according to this embodiment is performed, the fixing control temperature Tref takes only about 5 seconds to lower to the central portion temperature Tthmc. Consequently, as shown in FIG. 32, a rise of the end portion temperature Tthmf can be suppressed.

3-2-4) Fixing Unit Cooling Device Control

In the print fixing temperature correction control described above, if the fixing control temperature Tref decreases to the lower-limiting threshold value te and the fixing roller end portion temperature Tthmf sensed by the front thermistor 20f is 195° C. or more, the cooling device starts operating to cool the two end portions of the fixing roller.

Figure 33:
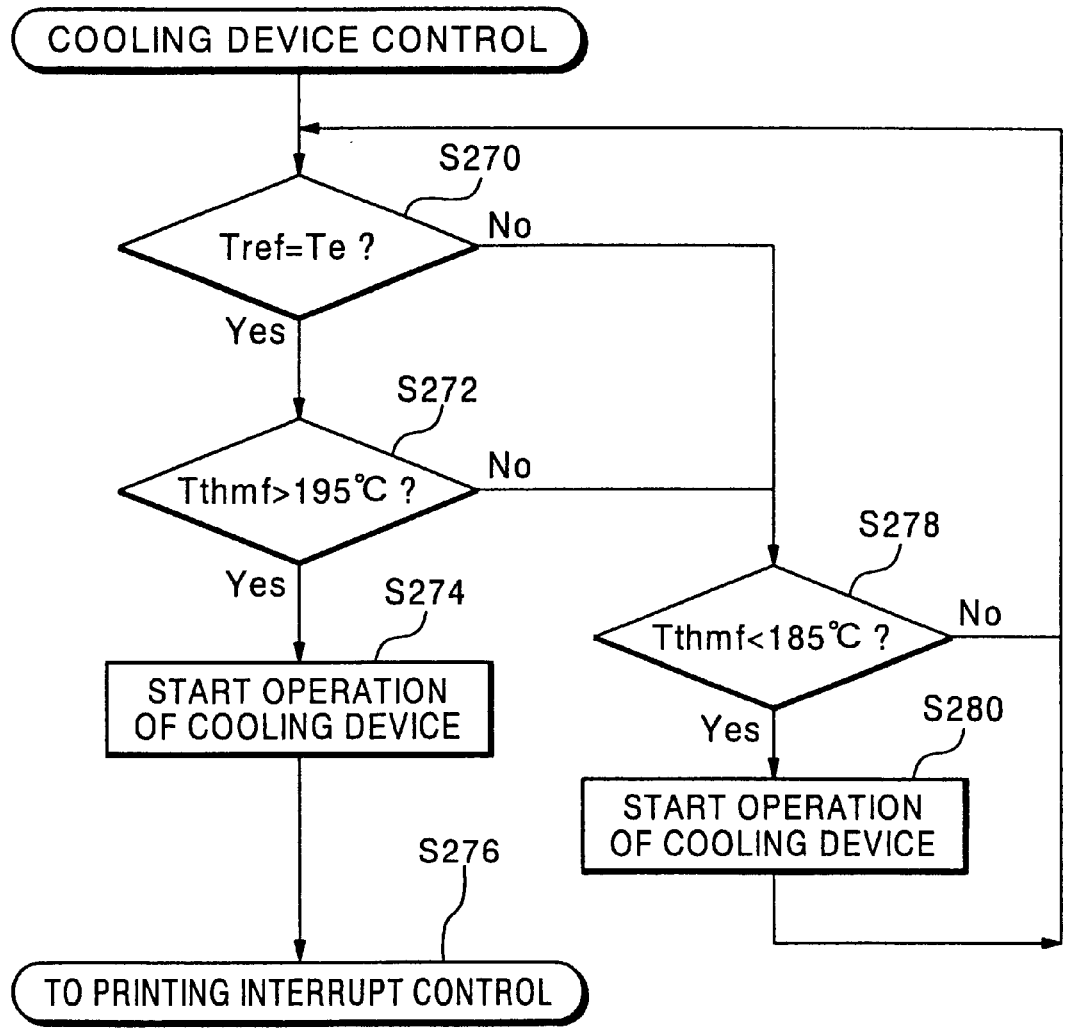
FIG. 33 is a flow chart showing the procedure of cooling device control of this embodiment.

The procedure of cooling device control in this case is as shown in FIG. 33. In step S270, whether the fixing control temperature Tref has decreased to the lower-limiting threshold value Te is checked. If the two values are equal, the flow advances to step S272; if not, the flow advances to step S278.

In step S272, whether the thermistor temperature Tthmf exceeds 195° C. is checked. If YES in step S272, the flow advances to step S274. If NO in step S272, the flow advances to step S278.

In step S274, the operation of the cooling device is started. More specifically, the operation of a cooling fan is started.

If in step S278 the thermistor temperature Tthmf is less than 185° C., the operation of the cooling device is started in step S280. If this temperature Tthmf exceeds 185° C., the flow returns to step S270.

After the operation of the cooling device is started in step S274, the flow advances to step S276 to perform printing interrupt control to be described later.

Figure 34:
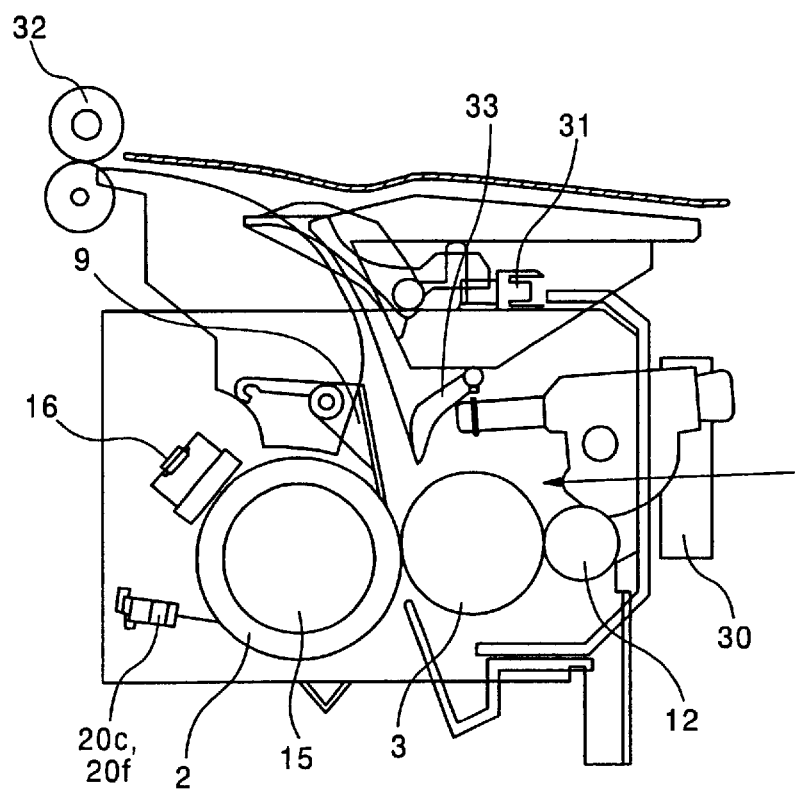
FIG. 34 is a longitudinal sectional view showing the structure of a cooling device used in this embodiment.

In this embodiment, as shown in FIG. 34, a cooling fan 30 mounted near the center of the press roller 3 is used as the cooling device. When the power supply is turned on, the motor of this cooling fan starts operating to rotate blades of the cooling fan 30. As a consequence, the outside air is blown in the direction of an arrow toward the press roller 3.

Figure 35:
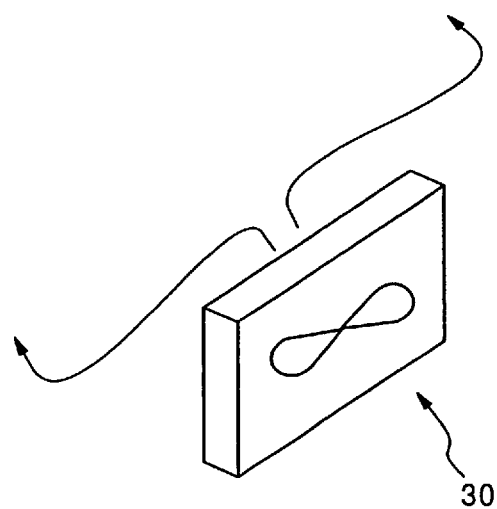
FIG. 35 is a perspective view showing the flows of the outside air formed by the cooling device.

As shown in FIG. 35, this outside air passing through the cooling fan 30 is divided into two portions through ducts (not shown) as indicated by arrows. These two air flows are blown from the openings of the ducts against the front and rear sides of each of the press roller 3 and the heat roller 2.

Figure 36A:
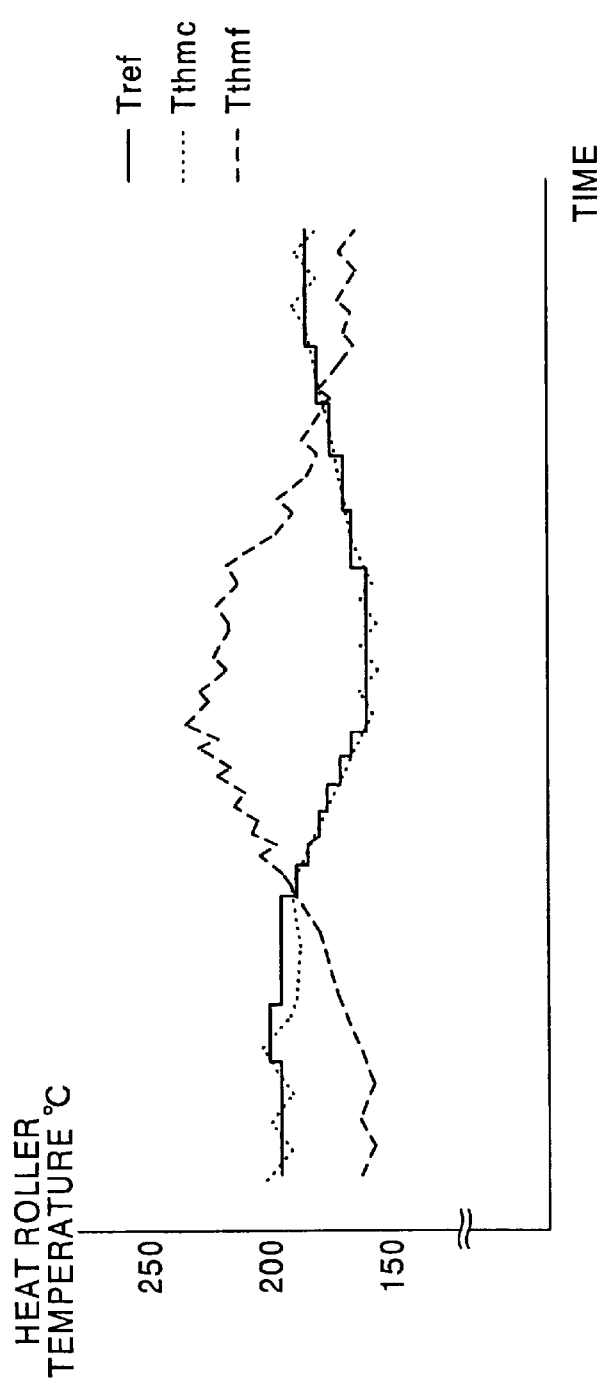
FIGS. 36A and 36B are graphs showing changes in the fixing temperature and the thermistor detection temperature when the cooling device control of this embodiment is performed.
Figure 36B:
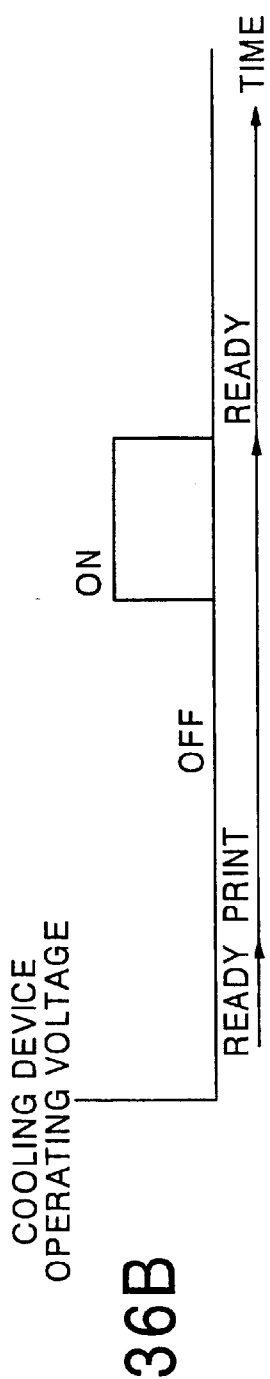

By the above cooling device control, the cooling fan starts operating as shown in FIG. 36B. Consequently, as shown in FIG. 36A, the fixing roller end portion temperature Tthmf lowers, and this prevents overshoot.

3-2-5) Printing Interrupt Control

If during printing the front thermistor temperature Tthmf or the center thermistor temperature Tthmc is equal to or smaller than a threshold value tf or equal to or larger than a threshold value tg while cooling device control is performed, pre-run is performed by interrupting the printing operation, and the process proceeds to printing start permission control.

When the temperature falls within the range of printing start permissible temperature, the printing operation is resumed.

In addition, the lower-limiting threshold value tf and the upper-limiting threshold value tg are changed in accordance with the environmental temperature or the print mode.

Plain paper (normal environment) mode:
  tf=150° C., tg=230° C., printing is interrupted if Tthmf or Tthmc<tf, tg≦Tthmf and Tthmc
Plain paper (low-temperature environment) mode;
  tf=165° C., tg=230° C., printing is interrupted if Tthmf or Tthmc<tf, tg≦Tthmf and Tthmc OHP mode:
  tf=160° C., tg=250° C., printing is interrupted if Tthmf or Tthmc<tf, tg≦Tthmf and Tthmc Thick paper mode:

tf=160° C., tg=250° C., printing is interrupted if Tthmf or Tthmc<tf, tg≦Tthmf and Tthmc Offset evaluation results as the basis for setting the lower-limiting threshold value tf and the upper-limiting threshold value tg are as follows.

| Heat roller temperature ° C. | 120 | 130 | 140 | 150 | 160 | 170 |
|---|---|---|---|---|---|---|
| Plain paper (normal environment) | X | X | X | ○ | ○ | ○ |
| Plain paper (low-temperature environment) | X | X | X | X | X | ○ |
| OHP | X | X | X | X | ○ | ○ |
| Thick paper | X | X | X | X | ○ | ○ |
| Heat roller temperature ° C. | 180 | 190 | 200 | 210 | 220 | 230 |
| Plain paper (normal environment) | ○ | ○ | ○ | ○ | ○ | ○ |
| Plain paper (low-temperature environment) | ○ | ○ | ○ | ○ | ○ | ○ |
| OHP | ○ | ○ | ○ | ○ | ○ | ○ |
| Thick paper | ○ | ○ | ○ | ○ | ○ | ○ |
| Heat roller temperature ° C. | 240 | 250 | 260 | | | |
| Plain paper (normal environment) | X | X | X | | | |
| Plain paper (low-temperature environment) | X | X | X | | | |
| OHP | ○ | ○ | X | | | |
| Thick paper | ○ | ○ | X | | | |

Figure 37:
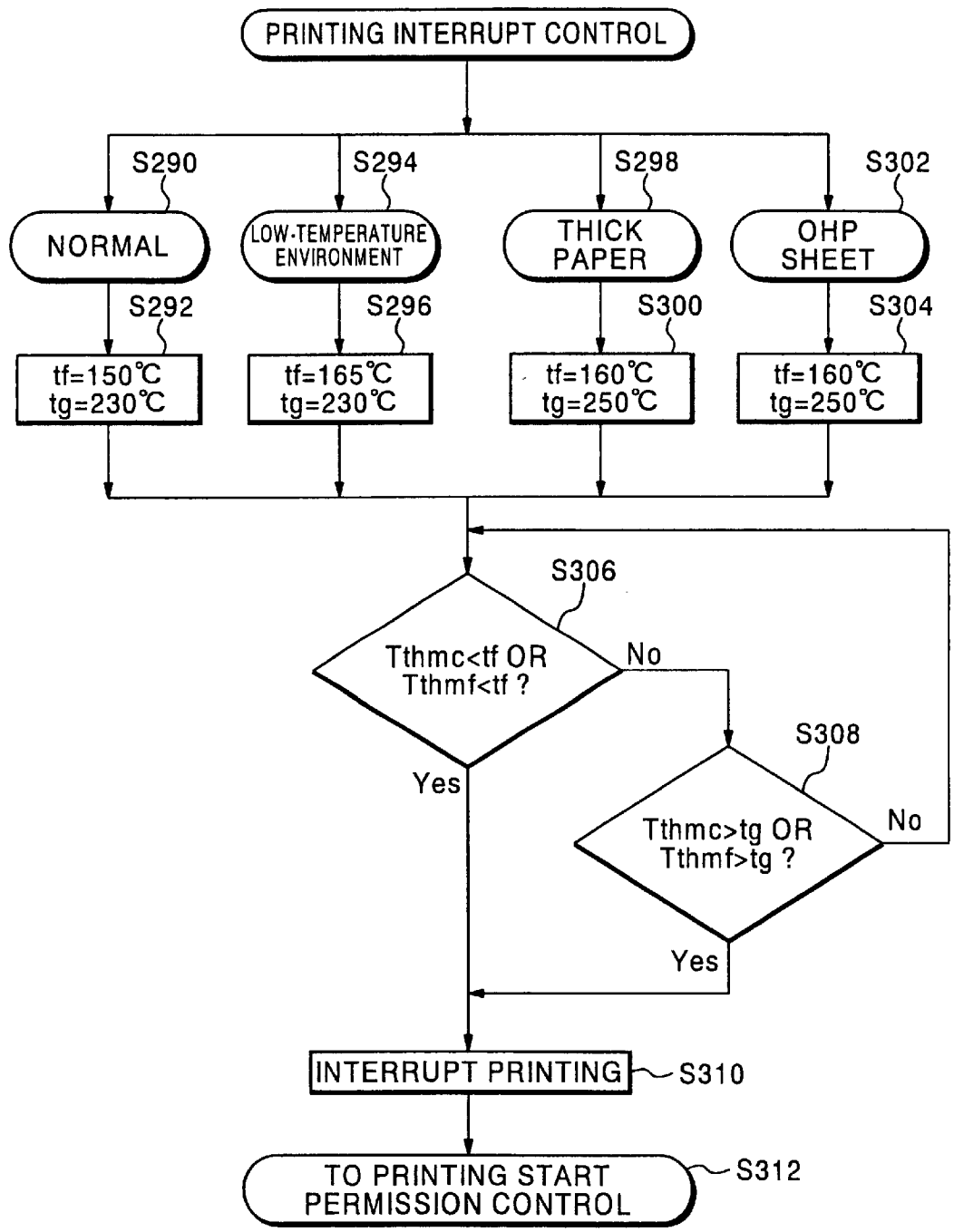
FIG. 37 is a flow chart showing the procedure of printing interrupt control of this embodiment.

FIG. 37 shows the procedure of this printing interrupt control.

The control is started in step S290, S294, S298, or S302 for the plain paper (normal environment) mode, plain paper (low-temperature environment) mode, thick paper mode, or OHP mode, respectively. In step S292, S296, S300, or S304, the lower-limiting threshold value tf and the upper-limiting threshold value tg are set to the above values.

In step S306, whether the thermistor temperature Tthmc or Tthmf is less than the lower-limiting threshold value tf is checked. If YES in step S306, printing is interrupted in step S310. In addition, in step S312 the flow proceeds to printing start permission control. If the thermistor temperature Tthmc or Tthmf is not less than the lower-limiting threshold value tf, the flow advances to step S308 to check whether the thermistor temperature Tthmc or Tthmf exceeds the upper-limiting threshold value tg. If YES in step S308, the flow advances to step S310. If NO in step S308, the flow returns to step S306.

By performing the above printing interrupt control, it is possible to suppress a temperature rise of the fixing roller and prevent the generation of an offset image.

(4) Pre-Run Control

Figure 38:
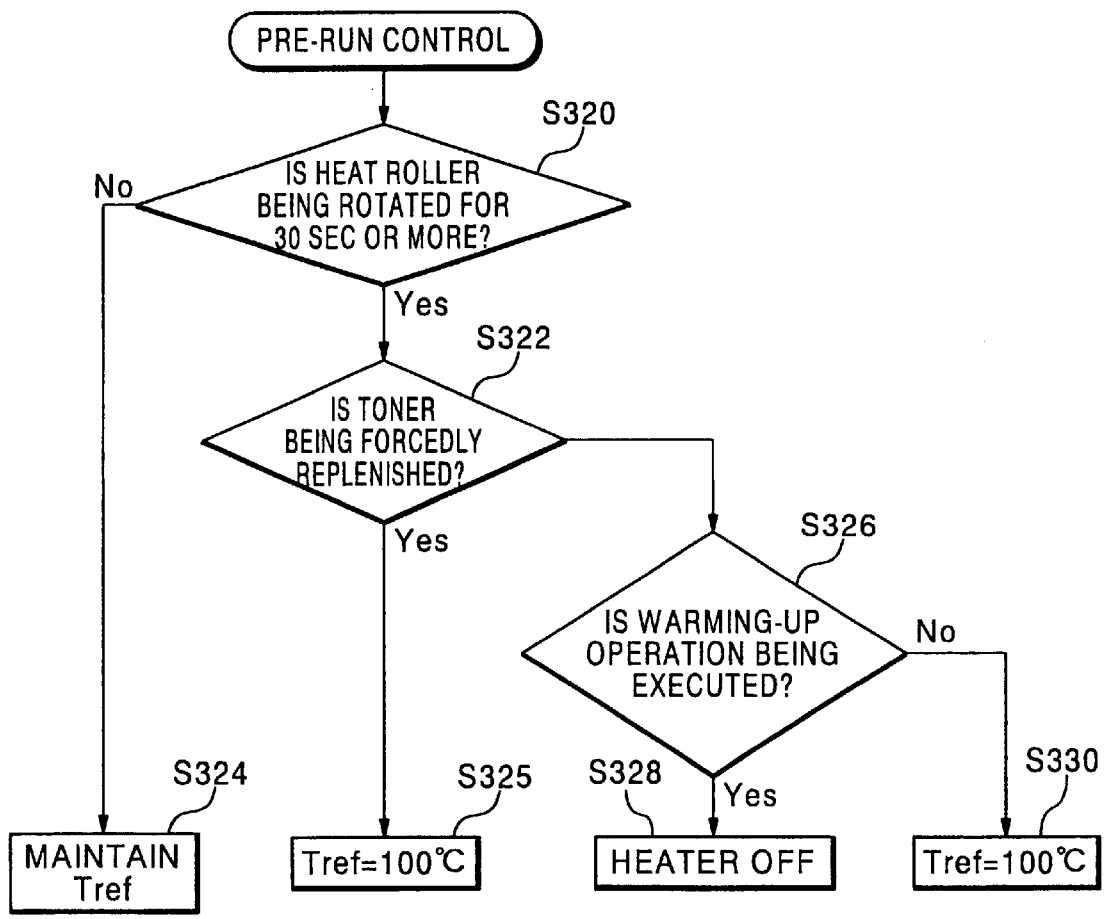
FIG. 38 is a flow chart showing the procedure of pre-run control of this embodiment.

FIG. 38 shows the procedure of pre-run control according to this embodiment.

In step S320, whether the heat roller 2 has been rotating for 30 seconds or more is checked. If NO in step S320, in step S324 the present value of the fixing control temperature Tref is maintained. If YES instep S320, the flow advances to step S322 to check whether toner is being forcedly replenished. If YES in step S322, in step S325 the fixing control temperature Tref is changed to 100° C. If NO in step S322, the flow advances to step S326 to check whether the warming-up operation is being executed.

If the warming-up operation is being executed, in step S328 the power supply to the IH coil is stopped. If no warming-up operation is being executed, in step S330 the fixing control temperature Tref is set at 100° C.

Figure 39:
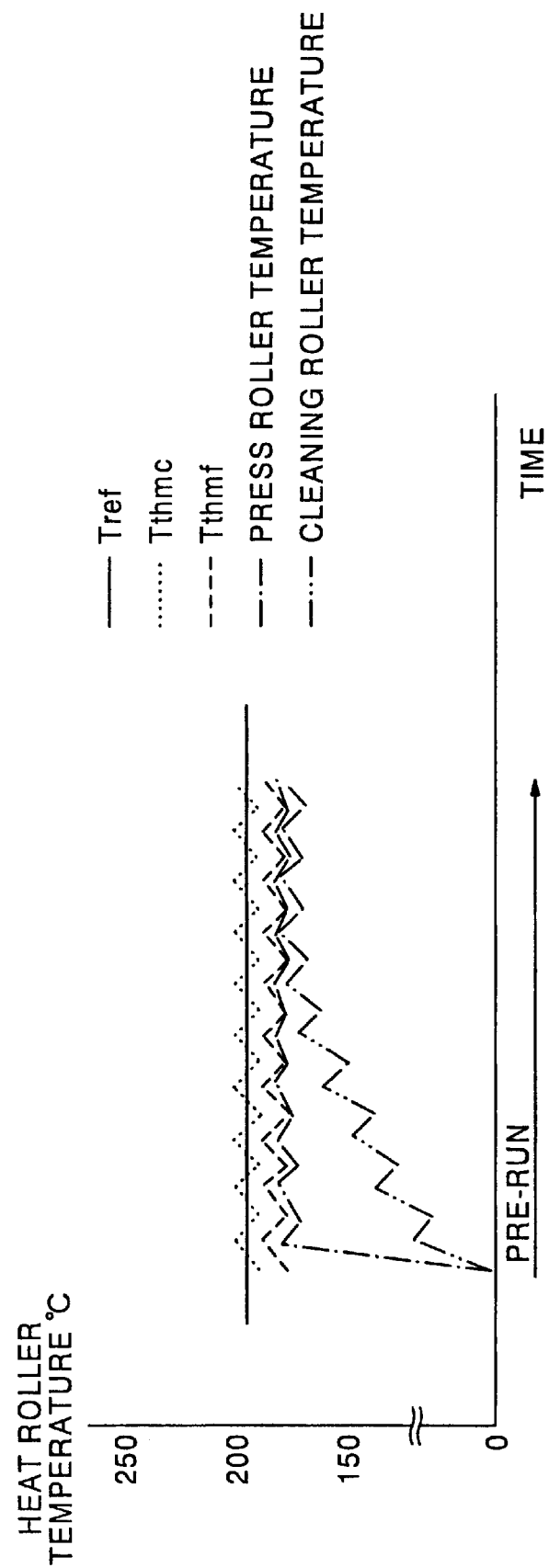
FIG. 39 is a graph showing changes in the fixing temperature and the thermistor detection temperature when pre-run control related to this embodiment is performed.

When pre-run is continued, the temperatures of the heat roller 2 and the press roller 3 rise rapidly because they both have small thermal capacity. Consequently, the temperature of the cleaning roller 12 also rises as shown in FIG. 39.

In the apparatus related to the present invention, the temperature of the cleaning roller was 180° C. when 30 seconds elapsed after pre-run was started. Accordingly, toner sticking to the surface of this cleaning roller melted and transferred to the press roller. This toner further transferred to sheets to produce image contamination.

In contrast, in this embodiment the fixing control temperature Tref is switched to 100° C. in a mode in which pre-run is continued for 30 seconds or more, such as when toner is forcedly replenished or when the fixing unit is rotated by machine process adjustment, e.g., when a developing agent toner density sensor is adjusted, the charge potential to the photosensitive drum is adjusted, the transfer potential is adjusted, or the separation potential is adjusted.

Also, during a warming-up operation after toner empty is detected, for example, the power supply to the IH coil 15 is stopped to turn off the heater.

Figure 40:
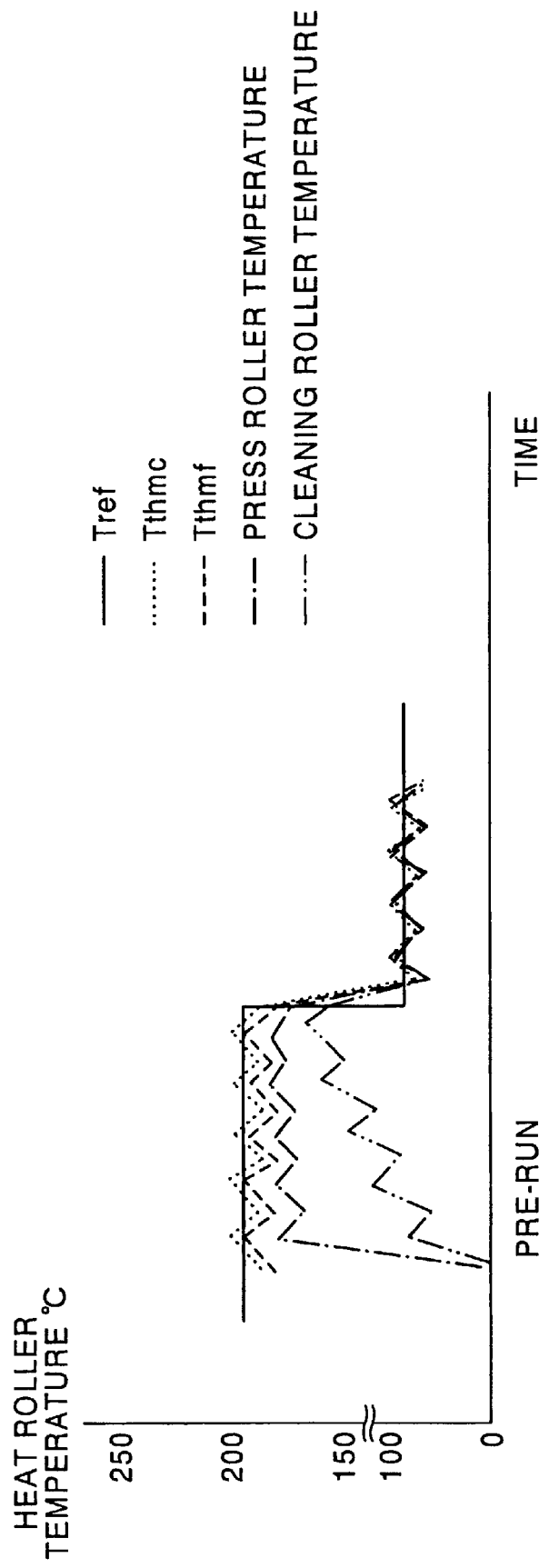
FIG. 40 is a graph showing changes in the fixing temperature and the thermistor detection temperature in this embodiment.

By performing this control, as shown in FIG. 40, it is possible to suppress rises of both the press roller temperature and cleaning roller temperature and prevent image contamination.

In the fixing control method and apparatus of the above embodiment as have been explained above, fixing control is performed on the basis of temperatures sensed by a first temperature sensor positioned within the range of ±45° from a portion where maximum heat is generated by an induction heating coil and a second temperature sensor positioned within the range of ±45° from a portion where minimum heat is generated by the coil. Accordingly, it is possible, with a simple circuit configuration, to uniformize the heat distribution of a fixing roller and realize good fixing properties, without increasing the first print time, while preventing an increase in the cost.

The above embodiment is merely an example and hence does not restrict the present invention. That is, the embodiment can be variously modified without departing from the technical scope of the invention.

What is claimed is:

1. A fixing control apparatus for performing a fixing process by using a heat roller heated by an induction heating coil, comprising:

a first temperature sensor positioned, around said heat roller, within a range of ±45° from a portion where maximum heat is generated by said induction heating coil;

a second temperature sensor positioned, around said heat roller, within a range of ±45° from a portion where minimum heat is generated by said induction heating coil; and a central processing unit for performing switching control of a fixing control temperature concerning the temperature of said heat roller on the basis of temperatures sensed by said first and second temperature sensors, wherein when power supply to said induction heating coil is started, said central processing unit lowers the fixing control temperature and the pre-run start temperature, as the temperature sensed by said first or second temperature sensor rises.

2. An apparatus according to claim 1, wherein said central processing unit lowers the fixing control temperature, as the temperature sensed by said first or second temperature sensor rises.

3. A fixing control apparatus for performing a fixing process by using a heat roller heated by an induction heating coil, comprising:

a first temperature sensor positioned, around said heat roller, within a range of ±45° from a portion where maximum heat is generated by said induction heating coil;

a second temperature sensor positioned, around said heat roller, within a range of ±45° from a portion where minimum heat is generated by said induction heating coil;

a central processing unit for performing switching control of a fixing control temperature concerning the temperature of said heat roller on the basis of temperatures sensed by said first and second temperature sensors; and an environmental temperature sensor for sensing an environmental temperature, wherein when power supply to said induction heating coil is started, said central processing unit changes at least one of the fixing control temperature, a pre-run start temperature at which pre-run is started, and a ready display temperature pertaining to temperature display in a ready state, on the basis of the temperatures sensed by said first and second temperature sensors, wherein on the basis of the environmental temperature sensed by said environmental temperature sensor, said central processing unit changes at least one of the fixing control temperature, the pre-run start temperature, and the ready display temperature, and wherein
in a normal environment in which the environmental temperature sensed by said environmental temperature sensor is higher than a threshold value, said central processing unit lowers the fixing control temperature whenever a predetermined time elapses while the temperature sensed by said first or second temperature sensor is lower than a first predetermined value, and, if the temperature sensed by said first and second temperature sensor becomes higher than the first predetermined value, maintains the fixing control temperature set at that point, and in a low-temperature environment in which the environmental temperature sensed by said environmental temperature sensor is lower than the threshold value, said central processing unit maintains, while the temperature sensed by said first or second temperature sensor is lower than a second predetermined value higher than the first predetermined value, the fixing control temperature at a temperature held at that point, and, if the temperature sensed by said first and second temperature sensor becomes higher than the second predetermined value, keeps the fixing control temperature lower than the temperature set at that point.

4. A fixing control apparatus for performing a fixing process by using a heat roller heated by an induction heating coil, comprising:

a first temperature sensor positioned, around said heat roller, within a range of ±45° from a portion where maximum heat is generated by said induction heating coil;

a second temperature sensor positioned, around said heat roller, within a range of ±45° from a portion where minimum heat is generated by said induction heating coil; and a central processing unit for performing switching control of a fixing control temperature concerning the temperature of said heat roller on the basis of temperatures sensed by said first and second temperature sensors, wherein
at the start of printing, said central processing unit changes the fixing control temperature on the basis of the temperatures sensed by said first and second temperature sensors, said fixing control apparatus further comprises an environmental temperature sensor for sensing an environmental temperature, and on the basis of the environmental temperature sensed by said environmental temperature sensor, said central processing unit changes, in accordance with a sheet to be printed, the fixing control temperature and a threshold value for determining whether an environment is a normal environment or a low-temperature environment on the basis of the environmental temperature sensed by said environmental temperature sensor.

5. A fixing control apparatus for performing a fixing process by using a heat roller heated by an induction heating coil, comprising:

a first temperature sensor positioned, around said heat roller, within a range of ±45° from a portion where maximum heat is generated by said induction heating coil;

a second temperature sensor positioned, around said heat roller, within a range of ±45° from a portion where minimum heat is generated by said induction heating coil; and a central processing unit for performing switching control of a fixing control temperature concerning the temperature of said heat roller on the basis of temperatures sensed by said first and second temperature sensors, wherein
during printing, said central processing unit changes the fixing control temperature for each sheet to be printed whenever a predetermined time elapses, on the basis of a result of comparison of the temperatures sensed by said first and second temperature sensors with a lower-limiting threshold value of a printing permissible range, said fixing control apparatus further comprises an environmental temperature sensor for sensing an environmental temperature, and on the basis of the environmental temperature sensed by said environmental temperature sensor, said central processing unit changes the lower-limiting threshold value.

6. An apparatus according to claim 5, wherein said central processing unit changes a delay time from the start of printing to the start of control of changing the fixing control temperature, on the basis of the temperatures sensed by said first and second temperature sensors.

7. An apparatus according to claim 5, wherein when a predetermined time has elapsed since the start of printing, said central processing unit changes the fixing control temperature in accordance with the temperature sensed by said first or second temperature sensor.

8. An apparatus according to claim 5, wherein
when the fixing control temperature lowers to the lower-limiting threshold value and the temperature sensed by said first or second temperature sensor rises to a predetermined temperature, said central processing unit starts the operation of a cooling device for cooling said heat roller, and when the temperature sensed by said first or second temperature sensor lowers to a second predetermined temperature lower than the first predetermined temperature, said central processing unit stops the operation of said cooling device.

9. An apparatus according to claim 8, wherein when at least one of the temperatures sensed by said first and second temperature sensors is lower than the lower-limiting threshold value or higher than an upper-limiting threshold value of a printing permissible range, said central processing unit interrupts the printing operation and starts a pre-run operation, when the temperatures sensed by said first and second temperature sensors fall within the range between the lower- and upper-limiting threshold values, said central processing unit resumes the printing operation, and said central processing unit changes the lower- and upper-limiting threshold values in accordance with the environmental temperature sensed by said environmental temperature sensor and with a sheet to be printed.

10. A fixing control method of performing a fixing process by using a heat roller heated by an induction heating coil, wherein switching control of a fixing control temperature concerning the temperature of the heat roller is performed on the basis of a temperature sensed by a first temperature sensor positioned, around the heat roller, within a range of ±45° from a portion where maximum heat is generated by the induction heating coil, and a temperature sensed by a second temperature sensor positioned, around the heat roller, within a range of ±45° from a portion where minimum heat is generated by the induction heating coil, and wherein when power supply to the induction heating coil is started, the fixing control temperature and the pre-run start temperature is lowered as the temperature sensed by the first or second temperature sensor rises.

11. A method according to claim 10, wherein in a normal environment in which an environmental temperature sensed by an environmental temperature sensor is higher than a threshold value, the fixing control temperature is lowered whenever a predetermined time elapses while the temperature sensed by the first or second temperature sensor is lower than a first predetermined value, and, if the temperature sensed by the first and second temperature sensor becomes higher than the first predetermined value, the fixing control temperature set at that point is maintained, and in a low-temperature environment in which the environmental temperature sensed by the environmental temperature sensor is lower than the threshold value, while the temperature sensed by the first or second temperature sensor is lower than a second predetermined value higher than the first predetermined value, the fixing control temperature is maintained at a temperature held at that point, and, if the temperature sensed by the first and second temperature sensor becomes higher than the second predetermined value, the fixing control temperature is kept lower than the temperature set at that point.

12. A fixing control method of performing a fixing process by using a heat roller heated by an induction heating coil, wherein switching control of a fixing control temperature concerning the temperature of the heat roller is performed on the basis of a temperature sensed by a first temperature sensor positioned, around the heat roller, within a range of ±45° from a portion where maximum heat is generated by the induction heating coil, and a temperature sensed by a second temperature sensor positioned, around the heat roller, within a range of ±45° from a portion where minimum heat is generated by the induction heating coil, wherein when power supply to the induction heating coil is started, at least one of the fixing control temperature, a pre-run start temperature at which pre-run is started, and a ready display temperature pertaining to temperature display in a ready state is changed on the basis of the temperatures sensed by the first and second temperature sensors, wherein on the basis of an environmental temperature sensed using an environmental temperature sensor, at least one of the fixing control temperature, the pre-run start temperature, and the ready display temperature is changed, and wherein the fixing control temperature is lowered as the temperature sensed by the first or second temperature sensor rises.

13. A fixing control method of performing a fixing process by using a heat roller heated by an induction heating coil, wherein switching control of a fixing control temperature concerning the temperature of the heat roller is performed on the basis of a temperature sensed by a first temperature sensor positioned, around the heat roller, within a range of ±45° from a portion where maximum heat is generated by the induction heating coil, and a temperature sensed by a second temperature sensor positioned, around the heat roller, within a range of ±45° from a portion where minimum heat is generated by the induction heating coil, and wherein at the start of printing, the fixing control temperature is changed on the basis of the temperatures sensed by the first and second temperature sensors, and on the basis of an environmental temperature sensed by an environmental temperature sensor, the fixing control temperature and a threshold value for determining whether an environment is a normal environment or a low-temperature environment on the basis of the environmental temperature sensed by the environmental temperature sensor, are changed in accordance with a sheet to be printed.

14. A fixing control method of performing a fixing process by using a heat roller heated by an induction heating coil, wherein switching control of a fixing control temperature concerning the temperature of the heat roller is performed on the basis of a temperature sensed by a first temperature sensor positioned, around the heat roller, within a range of ±45° from a portion where maximum heat is generated by the induction heating coil, and a temperature sensed by a second temperature sensor positioned, around the heat roller, within a range of ±45° from a portion where minimum heat is generated by the induction heating coil, and wherein during printing, the fixing control temperature is changed for each sheet to be printed whenever a predetermined time elapses, on the basis of a result of comparison of the temperatures sensed by the first and second temperature sensors with a lower-limiting threshold value of a printing permissible range, and on the basis of an environmental temperature sensed by an environmental temperature sensor, the lower-limiting threshold value is changed.

15. A method according to claim 14, wherein a delay time from the start of printing to the start of control of changing the fixing control temperature is changed on the basis of the temperatures sensed by the first and second temperature sensors.

16. A method according to claim 14, wherein when a predetermined time has elapsed since the start of printing, the fixing control temperature is changed in accordance with the temperature sensed by the first or second temperature sensor.

17. A method according to claim 14, wherein
when the fixing control temperature lowers to the lower-limiting threshold value and the temperature sensed by the first or second temperature sensor rises to a predetermined temperature, the operation of a cooling device for cooling the heat roller is started, and when the temperature sensed by the first or second temperature sensor lowers to a second predetermined temperature lower than the first predetermined temperature, the operation of the cooling device is stopped.

18. (Original) A method according to claim 17, wherein
when at least one of the temperatures sensed by the first and second temperature sensors is lower than the lower-limiting threshold value or higher than an upper-limiting threshold value of a printing permissible range, the printing operation is interrupted and a pre-run operation is started, when the temperatures sensed by the first and second temperature sensors fall within the range between the lower- and upper-limiting threshold values, the printing operation is resumed, and the lower- and upper-limiting threshold values are changed in accordance with the environmental temperature sensed by the environmental temperature sensor and with a sheet to be printed.

* * * * *